(12) United States Patent
Ikeda et al.

(10) Patent No.: US 8,150,232 B2
(45) Date of Patent: Apr. 3, 2012

(54) RECORDING MEDIUM, RECORDING DEVICE, PROGRAM, AND RECORDING METHOD

(75) Inventors: Wataru Ikeda, Osaka (JP); Satoshi Kondo, Kyoto (JP); Tadamasa Toma, Osaka (JP); Yoshinori Matsui, Nara (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 1172 days.

(21) Appl. No.: 11/574,217

(22) PCT Filed: Sep. 2, 2005

(86) PCT No.: PCT/JP2005/016116
§ 371 (c)(1),
(2), (4) Date: Oct. 24, 2007

(87) PCT Pub. No.: WO2006/025527
PCT Pub. Date: Mar. 9, 2006

(65) Prior Publication Data
US 2008/0187284 A1  Aug. 7, 2008

(30) Foreign Application Priority Data
Sep. 3, 2004  (JP) .................................. 2004-257236

(51) Int. Cl.
*H04N 9/80* (2006.01)
(52) U.S. Cl. ........................................ 386/241; 386/345

(58) Field of Classification Search .................. 386/200, 386/241, 328, 329, 332
See application file for complete search history.

(56) References Cited

U.S. PATENT DOCUMENTS

| 5,175,618 A | 12/1992 | Ueda et al. |
| 5,574,504 A | 11/1996 | Yagasaki et al. |
| 2003/0091331 A1 | 5/2003 | Kim et al. |
| 2004/0156623 A1 | 8/2004 | Kato et al. |
| 2005/0036763 A1* | 2/2005 | Kato et al. ..................... 386/69 |
| 2005/0105883 A1 | 5/2005 | Holcomb et al. |
| 2005/0152448 A1* | 7/2005 | Crinon et al. ............ 375/240.01 |

FOREIGN PATENT DOCUMENTS

| JP | 4-288790 | 10/1992 |
| JP | 6-98314 | 4/1994 |
| JP | 2001-169247 | 6/2001 |
| JP | 2003-284004 | 10/2003 |
| JP | 2005-151570 | 6/2005 |

\* cited by examiner

*Primary Examiner* — Huy T Nguyen
(74) *Attorney, Agent, or Firm* — Panasonic Patent Center; Dhiren Odedra; Kerry Culpepper

(57) ABSTRACT

A BD-ROM on which a VC-1 video stream and an entry map (EP_map) are recorded. The VC-1 video stream includes: (a) picture data (I/P picture) whose first fields are the intra frame coding format and whose second fields are the inter frame predictive coding format; and (b) picture data (P/I picture) whose first fields are the inter frame predictive coding format and whose second fields are the intra frame coding format. The entry map indicates entry positions (SPN) of the I/P pictures, in correspondence with playback times (PTS), but does not indicate entry positions of the P/I pictures.

18 Claims, 17 Drawing Sheets

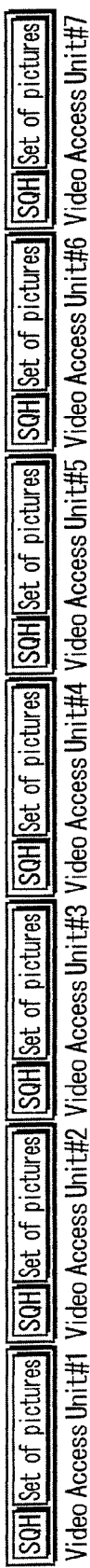
FIG. 2A
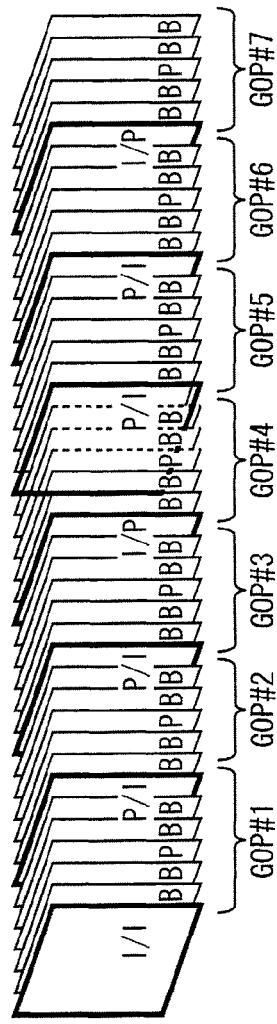
FIG. 2B  Video stream in VC-1 format
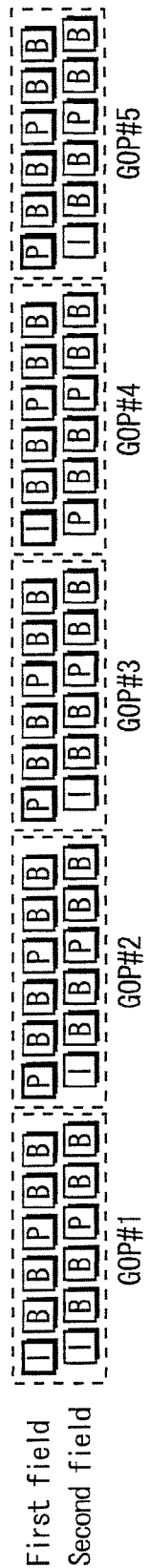
FIG. 2C

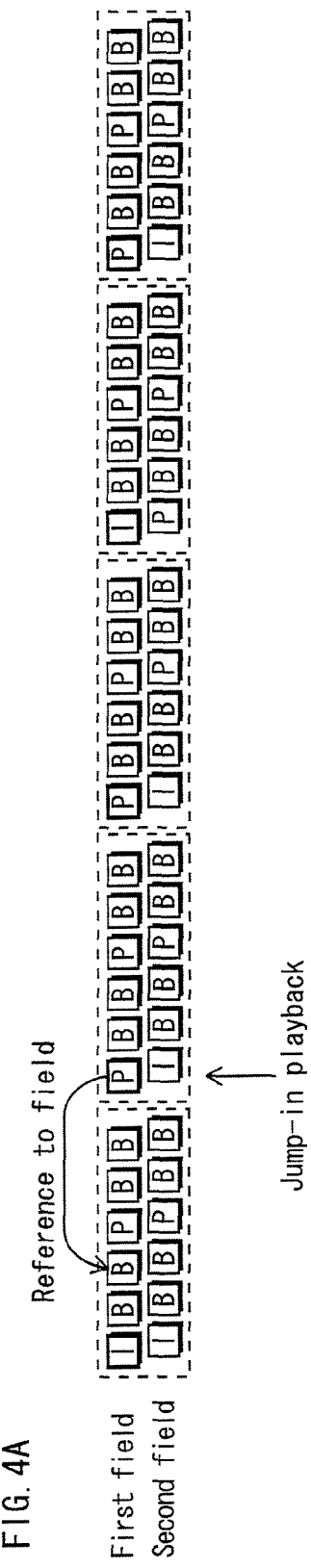
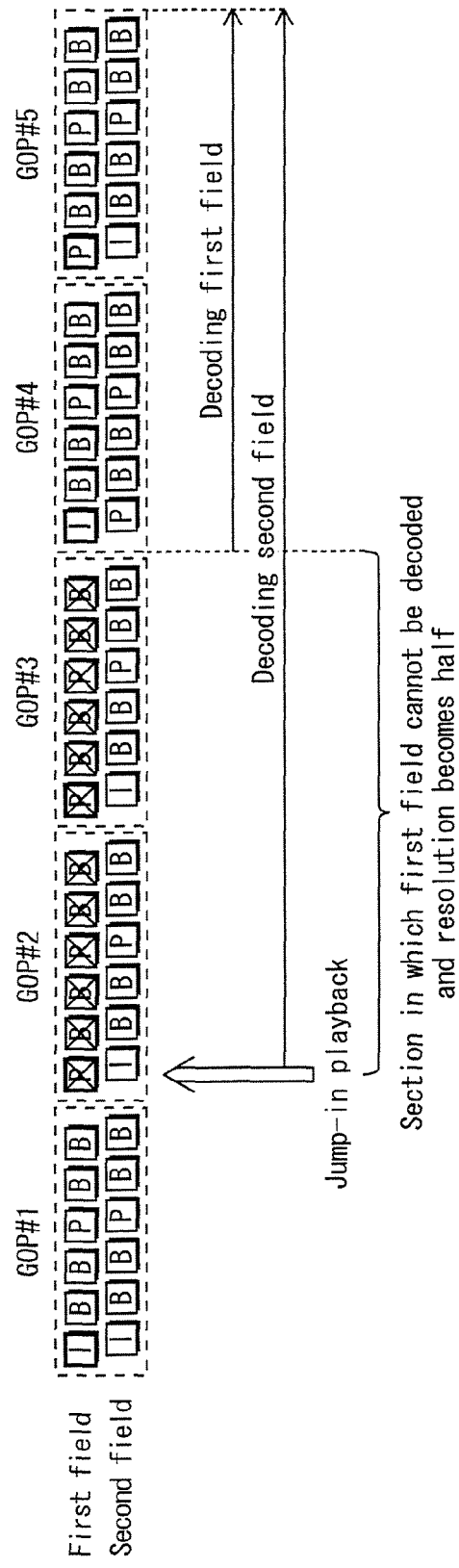
FIG. 4A
FIG. 4B

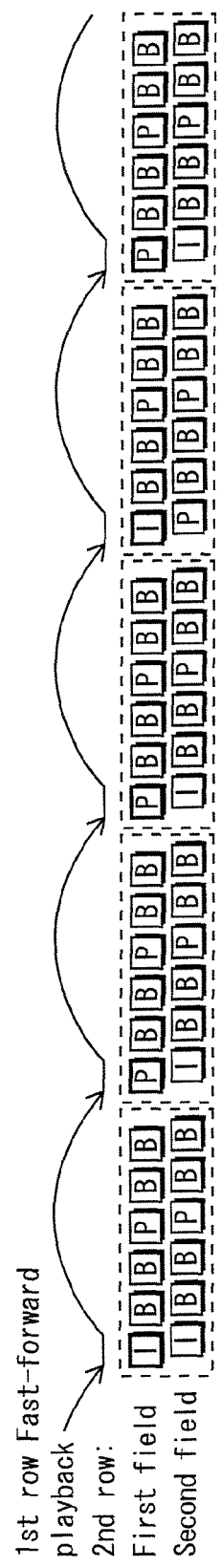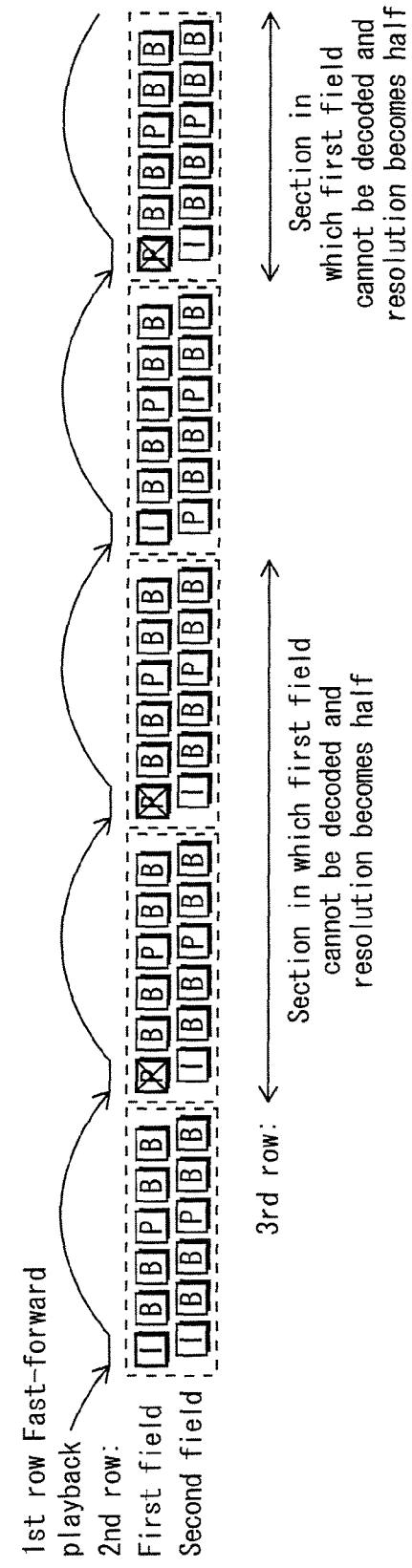

Case where input stream includes P/I picture

Case where input stream does not include P/I picture

RECORDING MEDIUM, RECORDING DEVICE, PROGRAM, AND RECORDING METHOD

TECHNICAL FIELD

The present invention belongs to a technical field including a random access technology.

BACKGROUND ART

The random access technology is a technology for converting a given point on a time axis of a video stream into a recording position in the video stream, and enabling a playback of the video stream to be started from the recording position. The random access technology is a basic technology that is indispensably required for playing back a video stream recording on a recording medium such as BD-ROM or DVD-Video.

When the video stream is composed of picture data encoded by a variable-length encoding method, the amount of information per picture varies. As a result, "stream analysis" is required to achieve the random access to the video stream. Here, the "stream analysis" is a process in which a process of extracting a header of a picture from the stream body, reading the picture size from the header, and identifying the recording position of the next picture from the picture size is repeated a plurality of times until the recording position of a desired picture is identified. Such an analysis requires highly frequent accesses to the stream. As a result, it takes a considerable time before a random access is completed. For this reason, an entry map is required when above-mentioned conversion is executed for a random access. Here, the entry map is information that indicates a plurality of entry times on the time axis in correspondence with a plurality of entry positions in the video stream. With use of the entry map, for example, when the plurality of entry times in the entry map have a time accuracy of one second, it is possible to perform the random access with a high efficiency, namely, at the time accuracy of one second.

In a random access to a video stream, it is required to search for a picture that is present at the start of a GOP. A data structure for supporting the search of the starting picture of a GOP has been provided as prior art in the following document.
Document 1: Japanese Patent Application Publication No. 2000-228656

DISCLOSURE OF THE INVENTION

The Problems the Invention is Going to Solve

Some encoding methods of video streams, however, produce such video streams that have a small amount of pictures whose fields all conform to intra frame coding format. When any conventional entry map is set in such a video stream, the entry map cannot have sufficient number of entry positions, and the intervals between continuous entry positions are extended. When the intervals between continuous entry positions are extended, the references to the entry map become less sufficient, and a larger number of analyses of the stream are required. This lengthens a response time, namely a time period from an issuance of the access instruction by the user to the actual reading of the stream portion at the specified position, since, as described above, the analysis of a stream requires highly frequent accesses to the stream.

On the other hand, if the starting picture data of the access unit of the video stream is specified as an entry position, it may be possible to select, as an entry position, picture data in which only part of the plurality of fields, which constitute one picture, conforms to the intra frame coding format. In this case, the proper decoding of the picture data, which is selected in the above-described manner, is not guaranteed. As a result, when a random access is started from an access unit that starts with such picture data, a playback is performed while some of the fields are missing. When this happens, the image is displayed at a half degree of resolution.

That the resolution changes between the full and half degrees depending on the access position is an unstable factor for the quality. This is a serious problem in the home electric appliance industry who are quite nervous about the image quality. As a result of this, playback apparatuses, which are used to play back the above-described video streams, hardly become prevalent in the market.

It is an object of the present invention to provide a recording medium that can remove the unstable factor in the aspect of quality that the resolution changes between the full and half degrees depending on the access position in a random access.

Means to Solve the Problems

An encoding format, which has a small amount of pictures whose fields all conform to intra frame coding format, is called "VC-1".

In "VC-1", the encoding format can be changed for each field. As a result, P/I picture, which is picture data composed of a first field being the inter frame predictive coding (Predictive) format and a second field being the intra frame coding (Intra) format, may become the starting picture of a GOP. If such pictures have been positively included in the entry map as entry positions, when a playback is started at a picture having a field of such format, some of the fields constituting the picture may not be decoded. When some fields are not decoded, the image is displayed with a half degree of resolution.

The above object is fulfilled by a recording medium on which a video stream and an entry map are recorded, wherein the entry map includes a plurality of pieces of entry information, each piece of entry information indicates an address of picture data, and the entry map does not include entry information that indicates an address of picture data whose first fields are an inter frame predictive coding format and whose second fields are an intra frame coding format.

Effects of the Invention

With the above-described structure of the recording medium in which the entry map does not include such entry information that indicates an address of picture data whose first fields cannot be decoded, it is possible to execute a random access by preventing images from being displayed with a half degree of resolution.

As far as random accesses are performed using the entry map having the above-described structure, the resolution of images does not change between the full and half degrees depending on the access position in the random accesses during a playback by a playback apparatus.

In so far as the entry map in the recording medium is used, the resolution of images does not change between the full and half degrees. This eliminates an unstable factor for the quality, and the home electric appliance industry can bring playback apparatuses for playing back VC-1 video streams, into the market without worry. This opens the way for the prevalence of such playback apparatuses.

In terms of reducing the response period, it is desirable that the entry map includes entry information that indicates an address of picture data whose first fields are the intra frame coding format and whose second fields are the inter frame predictive coding format.

With this structure, GOPs that start with a picture whose first fields are the intra frame coding (Intra) format are specified as entry positions, even if the second fields are the inter frame predictive coding (Predictive) format.

When the decoding starts with an I/P picture that is composed of first fields of the Intra format and second fields of the Predictive format, both the first fields and the second fields are decoded appropriately. This is not achieved when the decoding starts with a P/I picture. This is because in most cases, the second fields of the Predictive format refer to the first fields of the Intra format.

With the above-described structure, not only GOPs that start with the I/I picture whose first field and second field are both the Intra format, but also GOPs that start with the I/P picture are specified as entry positions. As a result of this, the time intervals between entry times become shorter. Due to this, sections in the stream that are subjected to the stream analysis are also shortened. This reduces a response time, namely a time period from issuance of a random access instruction by the user to the actual reading of the stream portion at the specified position.

The above-stated recording medium may further record a status flag therein, where the status flag indicates that the entry map does not include entry information that indicates an address of picture data whose first fields are the inter frame predictive coding format and whose second fields are the intra frame coding format.

With the above-described structure, it is possible to convey to a playback apparatus that the video stream includes other access units that are not specified by the entry information. The entry information regarding the P/I picture is omitted, and the interval between the entry positions has been extended as much as the omitted information. The playback apparatus can judge whether or not to supplement the extended interval by the stream analysis. Playback apparatuses having relatively high stream analysis ability can judge to supplement the extended interval by the stream analysis, and playback apparatuses having relatively low stream analysis ability can adopt an alternative method of restricting access destinations of the random accesses.

The above-described structure makes it possible to select either the stream analysis or restriction of access destinations of the random accesses, as a method of supplementing the extended interval between the entry positions. This prevents the user response from being degraded remarkably during execution of a random access by the playback apparatus.

BRIEF DESCRIPTION OF THE DRAWING

FIG. 2A shows a VC-1 video stream.

FIG. 2B shows a sequence of sets of pieces of picture data that belong to GOP #1, #2, #3, . . . #7, respectively.

FIG. 2C shows the field structure of the video stream shown in FIG. 2B.

FIG. 4A shows a jump-in playback in a video stream encoded by VC-1.

FIG. 4B shows how decoding is performed when the playback is started from a P/I picture that is the starting picture of the GOP.

FIG. 5A shows the field structure of GOPs in the video stream in the same manner as in FIG. 2B.

FIG. 5B shows first fields in the Predictive format that cannot be decoded in the double speed playback.

FIG. 10 shows the playback process performed by the playback apparatus in which the EP_map is referred to.

DESCRIPTION OF CHARACTERS

Figure 1:
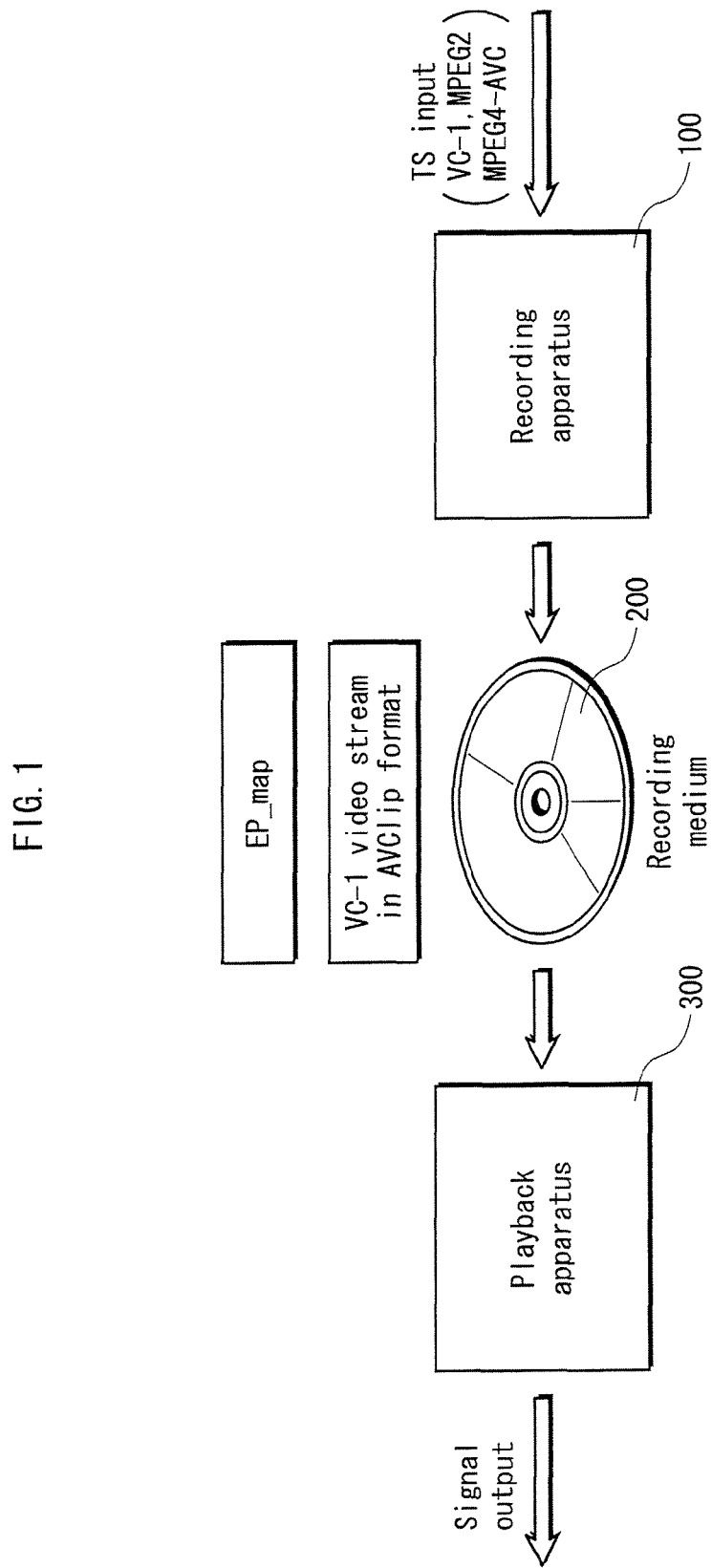
FIG. 1 shows a recording apparatus and a recording medium of the present invention and a playback apparatus.

1 ATS attaching unit
2 stream analyzing unit
3 FIFO memory
4 memory
5 EP_map generating unit
6 drive
100 recording apparatus
200 recording medium
300 playback apparatus

BEST MODE FOR CARRYING OUT THE INVENTION

The following describes embodiments of the recording medium and the recording apparatus of the present invention, with reference to the attached drawings. FIG. 1 shows a recording apparatus and a recording medium of the present invention and a playback apparatus.

<Recording Apparatus 100>

A recording apparatus 100 receives an input video stream in a transport stream (TS) format via an interface such as IEEE1394, subjects it to a video stream format conversion, and writes the result of the conversion onto a recording medium 200. In this conversion, a video stream in the TS format is converted into an AVClip format conforming to a BD-ROM standard. The input video streams include VC-1 video streams, MPEG4-AVC video streams, and MPEG2-Video video streams. FIG. 2A shows a VC-1 video stream. The VC-1 is an encoding method made by SMPTE (The Society of Motion Picture and Television Engineers). The VC-1 is based on the MPEG2-Video method or the MPEG4-Visual method, and has been extended with an encoding tool and the like.

In the VC-1, three profiles (simple, main, and advanced) are defined. The advanced profiles have a GOP (Group Of Pictures) structure that is also defined in the MPEG-2 Video.

The VC-1 video stream includes a plurality of video access units (Video Access Unit #1, #2, #3, . . . #7). These video access units constitute what is called GOP. Each video access unit is composed of: SeQuence_Header (SQH) that indicates the start of a GOP; and a plurality of pieces of picture data. These GOPs are classified into three types: (i) GOPs whose starting picture is I/I picture; (ii) GOPs whose starting picture is I/P picture; and (iii) GOPs whose starting picture is P/I picture. It is presumed here that Video Access Unit #1, #2, #3, . . . #7 shown in FIG. 2A correspond to GOP #1, #2, #3, . . . #7, respectively.

FIG. 2B shows a sequence of sets of pieces of picture data that belong to GOP #1, #2, #3, . . . #7, respectively. In FIG. 2B, it is presumed that the starting picture of GOP #1 is I/I picture, the starting picture of GOP #4 is I/P picture, and the starting pictures of GOPs #2, #3, #5, and #6 are P/I pictures.

Figure 3A:
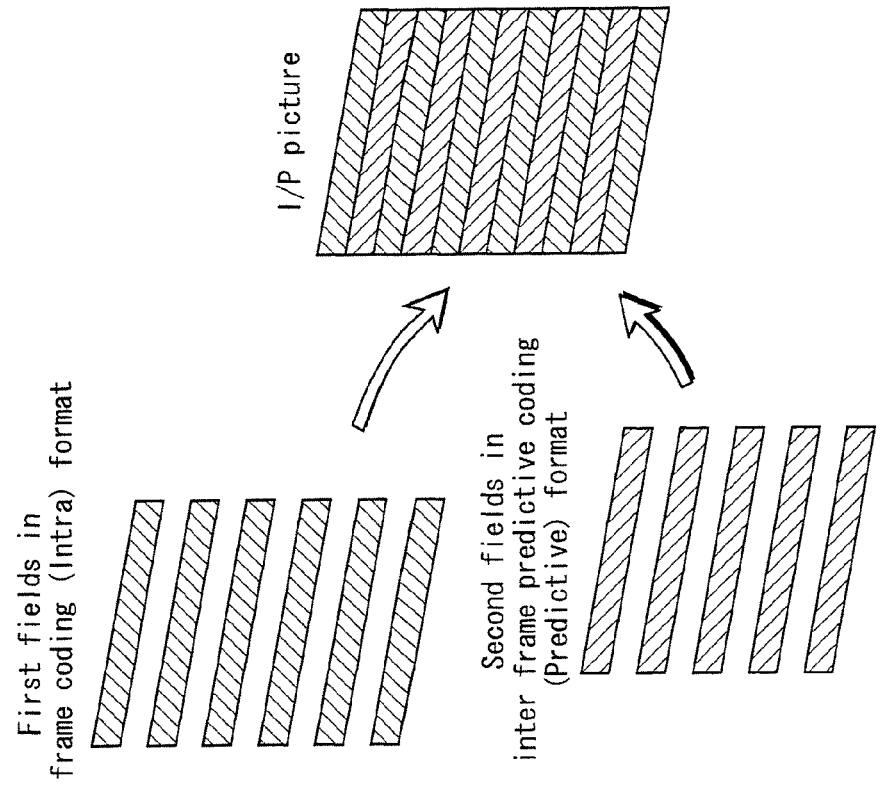
FIG. 3A shows the structure of the P/I picture.

FIG. 2C shows the field structure of the video stream shown in FIG. 2B. FIG. 3A shows the structure of the P/I picture. As shown in FIG. 3A, the P/I picture is composed of first fields being the inter frame predictive (Predictive) coding format and second fields being the intra frame coding (Intra) format. Since the first fields are the Predictive format, the P/I picture is required to refer to a picture which belongs to a preceding GOP.

Figure 3B:
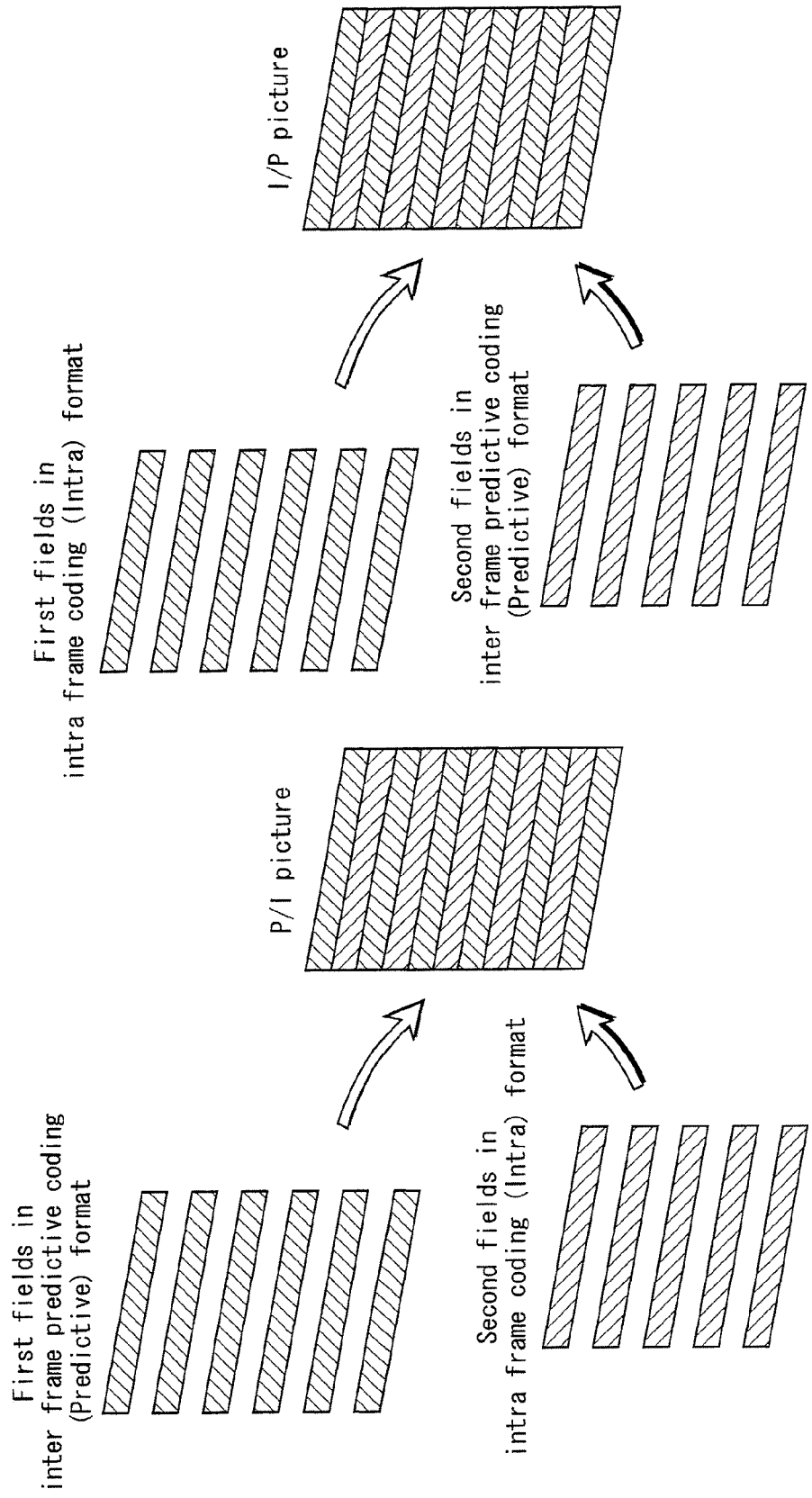
FIG. 3B shows the structure of the I/P picture.

FIG. 3B shows the structure of the I/P picture. As shown in FIG. 3A, the I/P picture is composed of first fields being the intra frame coding (Intra) format and second fields being the inter frame predictive coding (Predictive) format. Although the second fields are the Predictive format, they generally refer to the first fields in the same picture data. Up to now, the internal structure of the video stream has been described.

<Recording Medium 200>

The recording medium 200 is a recording medium in which AVClips are stored in correspondence with EP_maps.

<Playback Apparatus 300>

A playback apparatus 300 plays back AVClips stored in the recording medium 200. The playback available by the playback apparatus 300 is classified into a normal playback, a jump-in playback, and a double-speed playback. Of these, the double-speed playback is one application of the random access.

FIG. 4A shows a jump-in playback in a video stream encoded by VC-1. In executing the jump-in playback, the playback apparatus 300 receives, from the user, input of a chapter number and input of a time specifying that "the playback be started from xx(hours):yy(minutes):zz(seconds)", determines a playback time point from which the playback should be started, detects a GOP that is closest to the determined playback time point, reads the detected GOP and the succeeding GOPs from the AVClip, and provides the decoder with the read GOPs.

The video stream shown in FIG. 4A is the same as the video stream shown in FIG. 2A. It is supposed here that the user instructed to perform a jump-in playback in a GOP whose starting picture is a P/I picture. The first field of the P/I picture is the Predictive format, thus it refers to any picture in the preceding GOP, as indicated by the arrow in the drawing. FIG. 4B shows how decoding is performed when the playback is started from a P/I picture that is the starting picture of the GOP. In FIG. 4B, the sign "×" indicates that the first fields attached with the sign "×" cannot be decoded since the reference image is not present in the decoder. When this happens, the first fields cannot be decoded until a first field in the Intra format is read out by the playback apparatus 300. This reduces the resolution to half.

FIG. 5A shows accesses to a video stream in the double speed playback. In FIG. 5A, the field structure of GOPs in the video stream is represented in the same manner as in FIG. 2B. The first row in the drawing shows accesses to GOPs in the double speed playback. As shown in the first row of the drawing, the double speed playback is achieved by repeating a process in which only the starting picture of a GOP is read out, and the reading position moves to the picture of the next GOP.

FIG. 5B shows first fields that cannot be decoded in the double speed playback. In FIG. 5B, the sign "×" indicates that the first fields attached with the sign "×" cannot be decoded. This is because all these first fields are the Predictive format. The first fields cannot be decoded in the sections in which the Predictive format is present in this manner, and the resolution becomes half.

Figure 6:
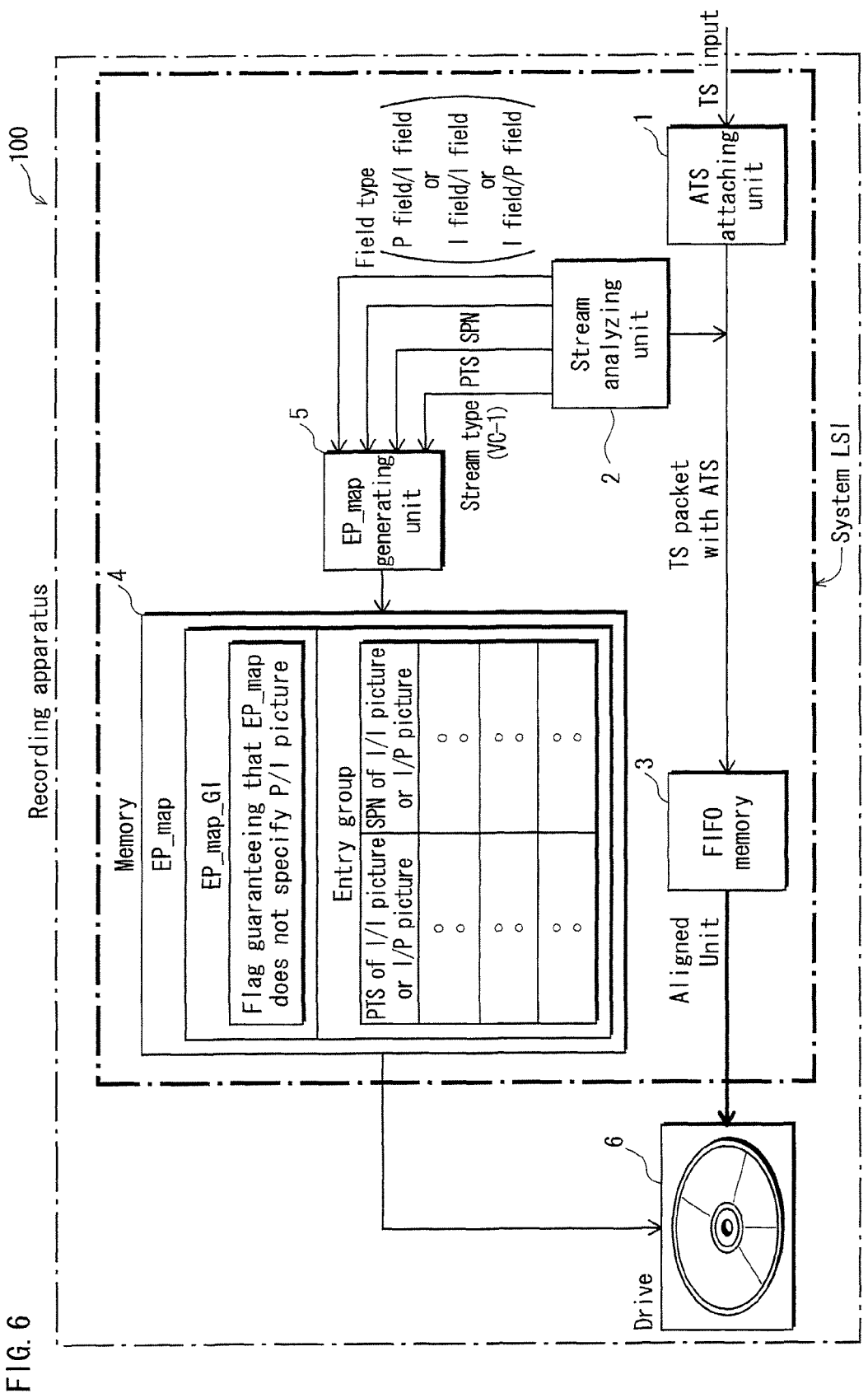
FIG. 6 shows an internal structure of the recording apparatus in the present embodiment.

The recording apparatus 100 in the present embodiment is structured to avoid the resolution from becoming half during the jump-in playback or the double-speed playback, as shown in FIG. 6. FIG. 6 shows an internal structure of the recording apparatus 100 in the present embodiment. As shown in FIG. 6, the recording apparatus 100 includes an ATS attaching unit 1, a stream analyzing unit 2, a FIFO memory 3, a memory 4, an EP_map generating unit 5, and a drive 6.

The ATS attaching unit 1 detects isochronous packets that are inserted in a TS packet at various locations, and generates Arribal_Time_Stamps based on the times that the clock of the recording apparatus measures at points in time when the isochronous packets are detected. The ATS attaching unit 1 then attaches the Arribal_Time_Stamps to the TS packet. The Arribal_Time_Stamps are used to refer to time stamps such as PCR and PTS during a stream playback. In general, PCR and PTS are set in a video stream of the MPEG2-TS format transmitted from a broadcast station on the presumption that it is received and played back in real time. During an accumulation playback, however, a video stream of the MPEG2-TS format is accumulated in a recording medium first, and then is played back after a considerable time period lapses. In such an accumulation playback, the values of PCR and PTS, which are adjusted for the purpose of playing back in real time, are wasted. As a result, the Arribal_Time_Stamp in the TP_extra_header indicates a time at which the TS packet arrives the recording apparatus. Accordingly, with an arrangement in which this Arribal_Time_Stamp is referred to during the playback, the playback timing control using the PTS and PCR is available as in a playback in real time even if a video stream of the MPEG2-TS format is first accumulated in a Blu-ray disc or the like, and then played back. Each TS packet has 188 bytes, and each TS_extra_header has four bytes. Accordingly, the TS packet attached with the TS_extra_header as described above has 192 bytes.

The stream analyzing unit 2 determines the encoding method of a video stream when it is input into the recording apparatus 100, judges whether or not the SQH is present in a TS packet, for each of TS packets that are sequentially input, and if the SQH is present, detects PTS (Presentation Time Stamp) and SPN (Source Packet Number) from the picture (namely, the starting picture of the GOP) that succeeds immediately to the SQH. Here, the PTS is a time stamp that defines the playback start time of a picture, and the SPN indicates a packet number of a TS packet that stores the starting portion of the picture. The stream analyzing unit 2 also determines the picture type of the picture.

The FIFO memory 3 is achieved by a FIFO for storing TS packets attached with TS_extra_headers (hereinafter merely referred to as EXs) by the first-in-first-out method. A group of 32 pieces of TS packets with EXs has 6144 (=32×192) bytes. This size matches the size of three sectors (6144=2048×3). The 32 pieces of TS packets with EXs stored in three sectors are called "Aligned Unit".

The memory 4 is a memory for storing EP_maps. The data indicating the navigation structure of the recording medium 200 is stored in the memory 4 until the entire stream has been recorded, and the data indicating the navigation structure of the recording medium 200 is written on the recording medium after the recording of the entire stream is completed.

Figure 7A:
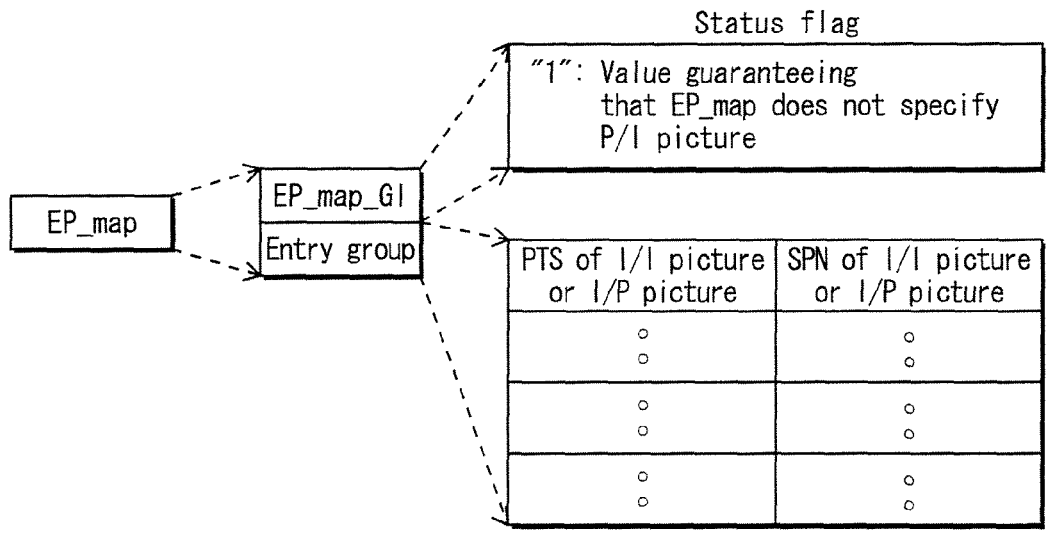
FIG. 7A shows an EP_map generated when an EP_map is not present in the input video stream.

The EP_map generating unit 5 generates an EP_map on the memory 4 using the PTS and SPN sent from the stream analyzing unit 2. The EP_map generated by the EP_map generating unit 5 has a different format depending on whether the P/I picture is present. FIG. 7A shows an EP_map generated by the EP_map generating unit 5 when the P/I picture is present in the input video stream. The EP_map shown in FIG. 7A includes general information thereof (EP_map_GI) and an entry group. The entry group is composed of a plurality of pieces of entry information. The entry information indicates an entry time and an entry position in correspondence with each other. Here, the entry time is represented by a PTS of an I/I picture or an I/P picture, and the entry position is represented by an SPN of an I/I picture or an I/P picture.

The EP_map_GI includes a status flag. The status flag is a flag indicating the status of an EP_map. When the status flag is set to "1", it indicates that the P/I picture is present in the stream, but that the EP_map does not specify the P/I picture.

When the status flag is "0", the playback apparatus recognizes that the P/I picture is not present in the video stream, and that the interval between the entry positions has minimum narrowness. On the other hand, when the status flag is "1", the playback apparatus recognizes that the video stream includes P/I pictures that are not specified as entry positions and thus are omitted, and that the interval between the entry positions has been extended as much as the omitted P/I pictures. The playback apparatus can judge, by referring to the status flag, whether or not to supplement the extended interval by the stream analysis. Playback apparatuses having relatively high stream analysis ability can judge to supplement the extended interval by the stream analysis, and playback apparatuses having relatively low stream analysis ability can adopt an alternative method of restricting access destinations of the random accesses.

The above-described structure makes it possible to select between the stream analysis and the restriction of the access destinations to supplement the extended interval between entry positions, thus preventing the user response from being degraded remarkably during execution of a random access by the playback apparatus.

The drive 6 attaches error correction codes to a plurality of Aligned Units stored in the FIFO memory 3, and write them onto the recording medium 200. This writing process is continued as far as TSs are input to the recording apparatus 100 in sequence and Aligned Units are newly stored in the FIFO memory 3. When the input of TSs stops and generation of new Aligned Units is ended, the EP_map that is present in the memory 4 is written onto the recording medium 200.

Up to now, the internal structure of the recording apparatus in the present embodiment has been described.

The playback apparatus 300 can recognize, by referring to the status flag in the EP_map_Gi of the EP_map, whether an AVClip to be played back does not include a P/I picture, or the AVClip to be played back includes a P/I picture but the EP_map does not specify the P/I picture.

Figure 7B:
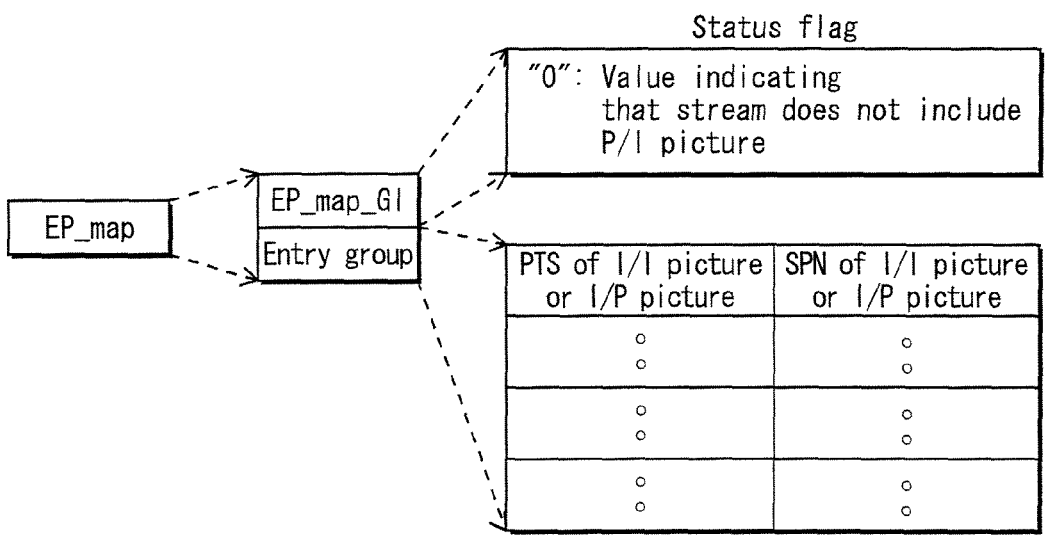
FIG. 7B shows an EP_map that is generated by the EP_map generating unit 5 when an input TS includes a P/I picture.

FIG. 7B shows an EP_map that is generated by the EP_map generating unit 5 when an input TS does not include a P/I picture. In FIG. 7B, the entry group indicates addresses of I/I pictures or I/P pictures in correspondence with PTSs. On the other hand, the status flag included in the EP_map_GI of this EP_map is set to "0". The value "0" set in the status flag indicates that the input TS does not include a P/I picture. The playback apparatus can recognize, by referring to this value of the status flag, that the AVClip to be played back does not include a P/I picture.

Figure 8:
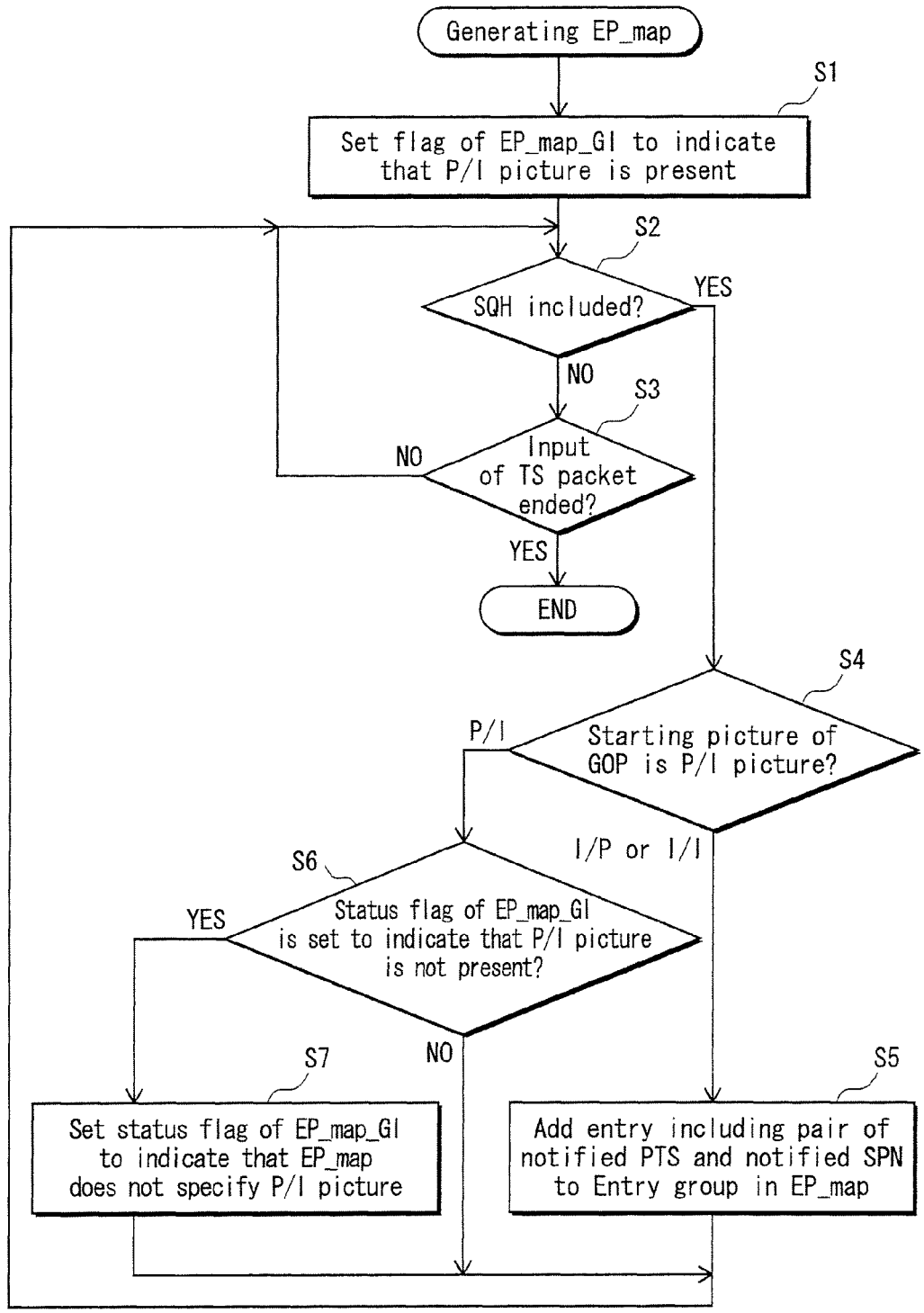
FIG. 8 is a flowchart showing the procedures in which the EP_map generating unit 5 generates the EP_map.

FIG. 8 is a flowchart showing the procedures in which the EP_map generating unit 5 generates the EP_map. In step S1 of this flowchart, the status flag is set to indicate that the P/I picture is present in the stream, then a loop process composed of steps S2-S3 is performed. The steps S2-S3 are performed to monitor the input of TS packets to the apparatus. In step S2, it is judged whether or not an input TS packet includes an SQH. In step S3, it is judged whether or not the input of TS packet ended.

If the input TS packet includes an SQH, it is judged whether or not the starting picture of a GOP in the video access unit, to which the SQH belongs, is P/I picture (step S4). If the starting picture is not P/I picture but I/P picture or I/I picture, entry information including a pair of a notified PTS and a notified SPN is added to the Entry group in the EP_map (step S5).

On the other hand, if the starting picture of the GOP is P/I picture, it is judged whether or not the status flag is set to indicate that the P/I picture is not present (step S6). If the status flag is set so, the value of the status flag is set to indicate that the P/I picture is present but the EP_map does not specify the P/I picture (step S7), and the control returns to the loop process composed of steps S2-S3. This completes the description of the procedures in which the EP_map generating unit 5 generates the EP_map.

Figure 9:
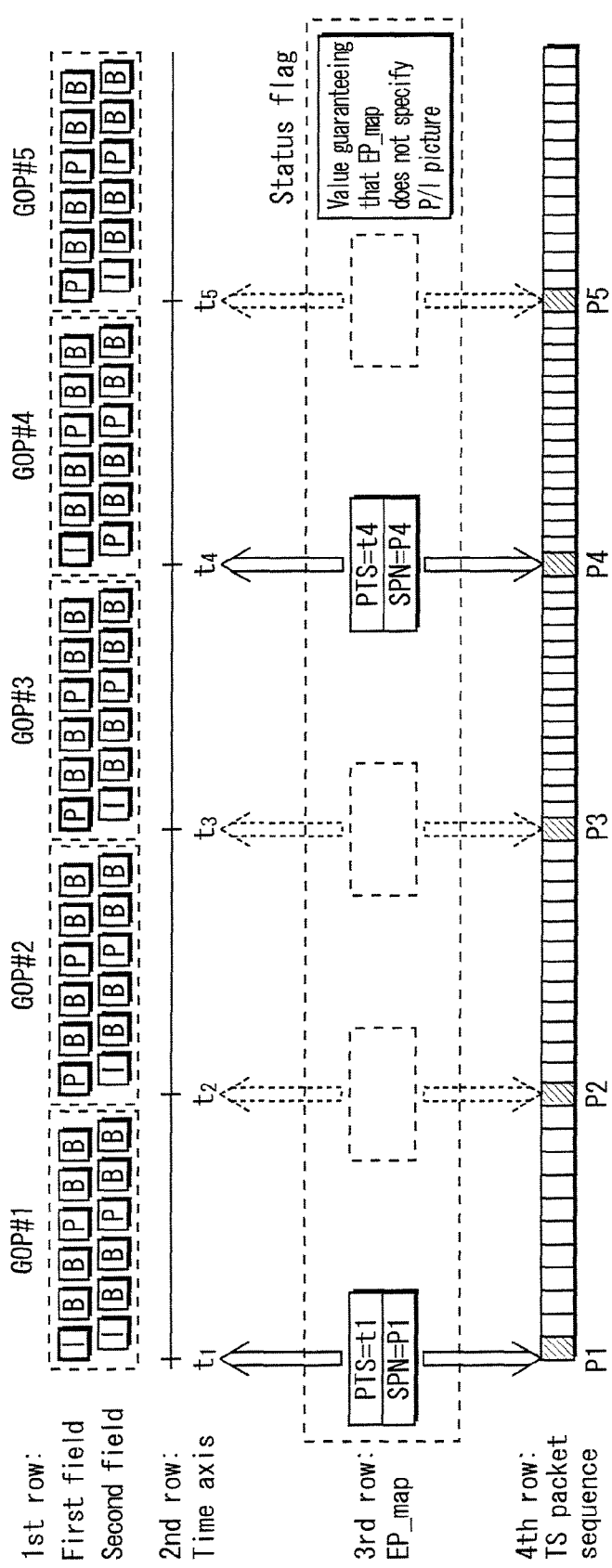
FIG. 9 shows the EP_map generated for the AVClip shown in FIG. 2.

FIG. 9 shows the EP_map generated for the AVClip shown in FIG. 2. The first row in the drawing shows the field structure of the target video stream; the second row shows the time axis of the AVClip; the third row shows the EP_map for the AVClip; and the fourth row shows a sequence of TS packets constituting the AVClip.

Each piece of entry information in the EP_map shown in the third row includes PTSs and SPNs of I/I pictures or I/P pictures, but does not include PTSs and SPNs of P/I pictures. The status flag is set to "1".

Figure 10:
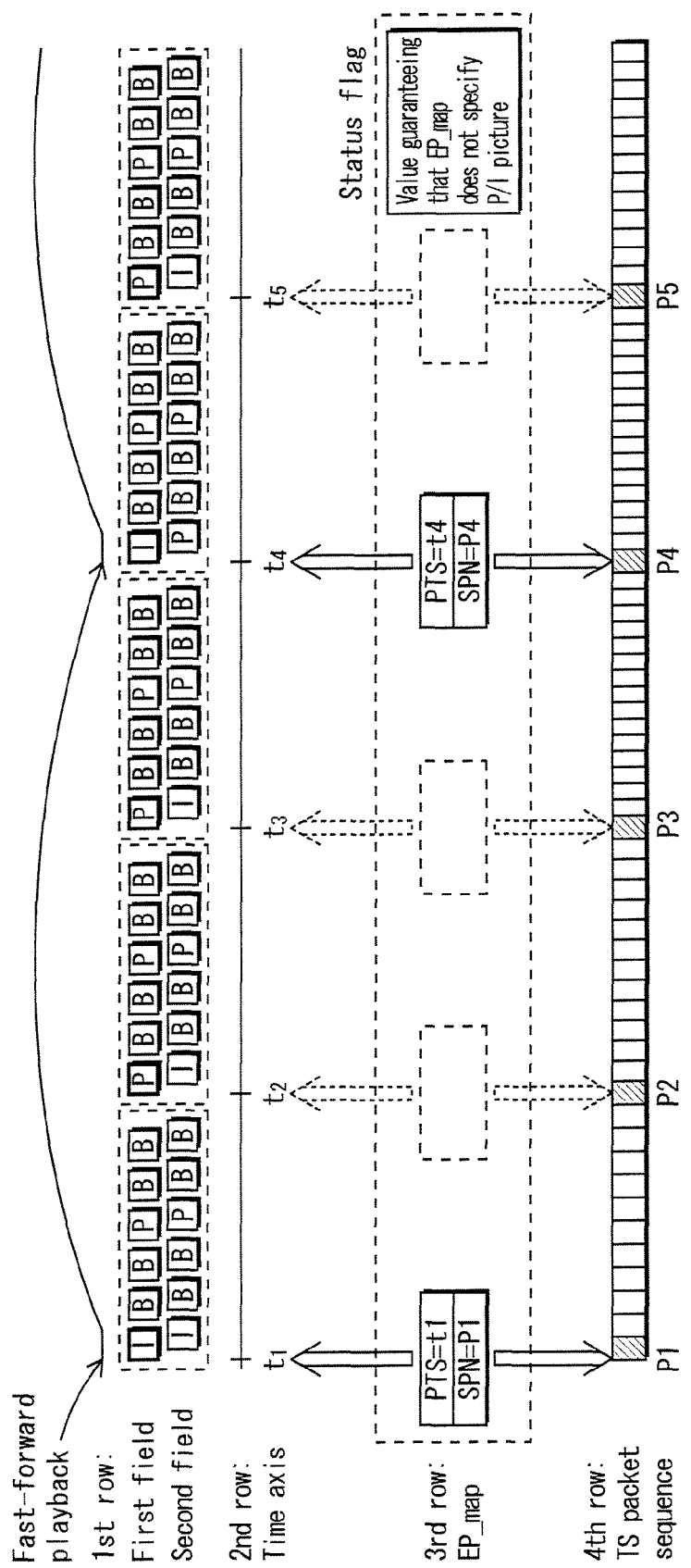

When an AVClip is recorded in the recording medium 200 together with the EP_map structured as described above, the playback apparatus 300 accesses only I/I pictures and I/P pictures whose PTSs and SPNs are included in the EP_map. FIG. 10 shows the playback process performed by the playback apparatus 300 in which the EP_map is referred to. As shown in the drawing, the playback apparatus 300 performs the double-speed playback by referring to the I/I pictures and I/P pictures. Accordingly, there is no omitting a first field during the playback.

As described above, the present embodiment removes the unstable factor for the quality that the resolution changes between the full and half degrees depending on the access position, in so far as the playback apparatus executes random accesses based on the entry map recorded on the recording medium. This makes it possible to develop application products that handle VC-1 video streams, and to circulate the application products in the market. The home electric appliance industry would gain great advantage effects from this.

Embodiment 2

Figure 11:
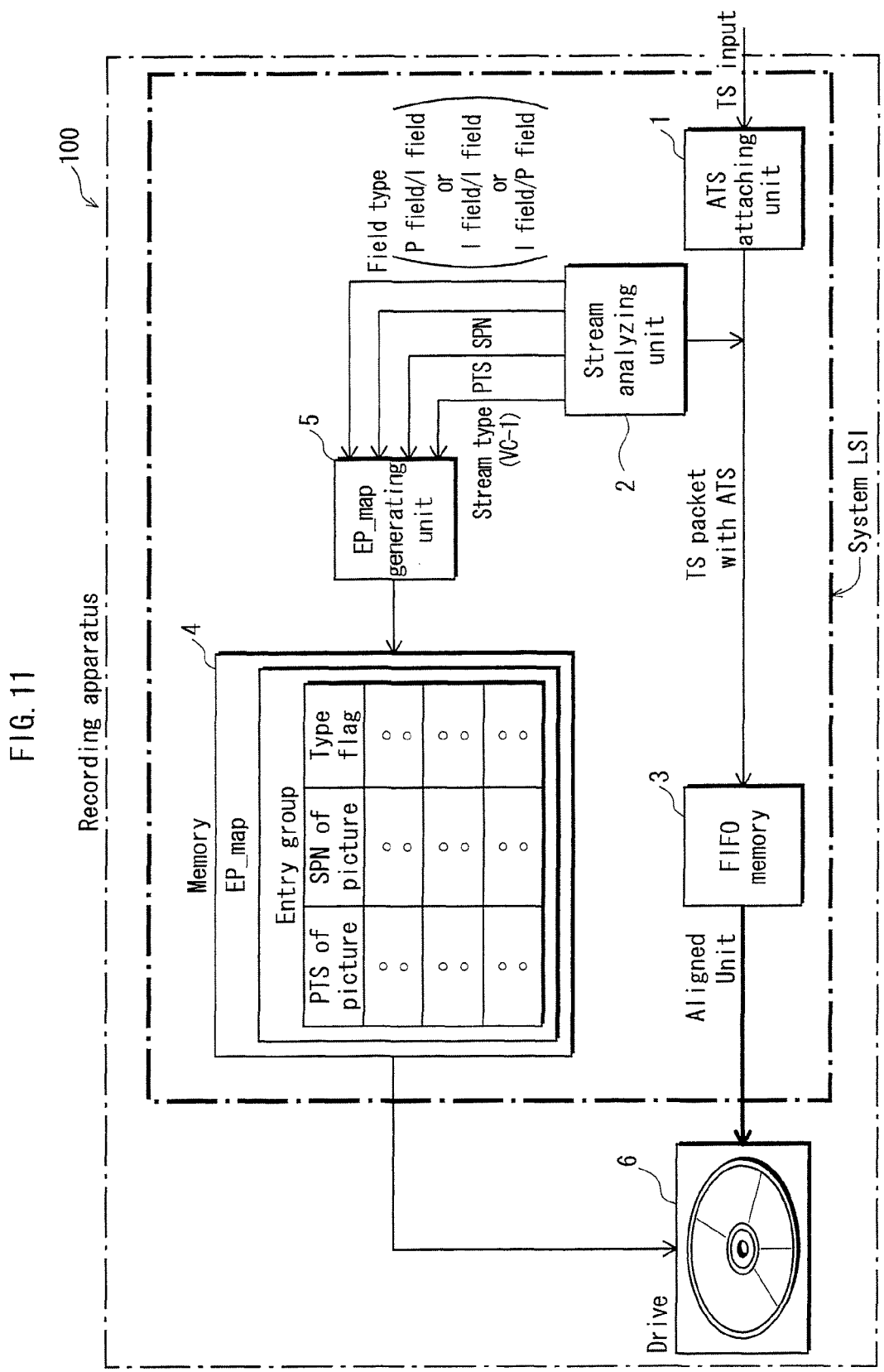
FIG. 11 shows an internal structure of the recording apparatus in Embodiment 2.

In Embodiment 1, when the starting picture of a GOP is a P/I picture, the entry information on the picture is not generated. In the present embodiment, the entry information on the P/I picture is generated. In addition, to cause the playback apparatus 300 to recognize the generated entry information to be a P/I picture, the entry information is provided with a type flag. FIG. 11 shows an internal structure of the recording apparatus 100 in Embodiment 2. The recording apparatus 100 shown in FIG. 11 differs from the recording apparatus 100 in Embodiment 1 in that each entry is provided with a type flag when the entry group is generated, and that the EP_map generating unit 5 sets a stream type notified from the stream analyzing unit 2, in the type flag. In this way, as each piece of entry information in the entry group is provided with a type flag, EP_map as shown in FIG. 12 is written onto the recording medium 200.

Figure 12A:
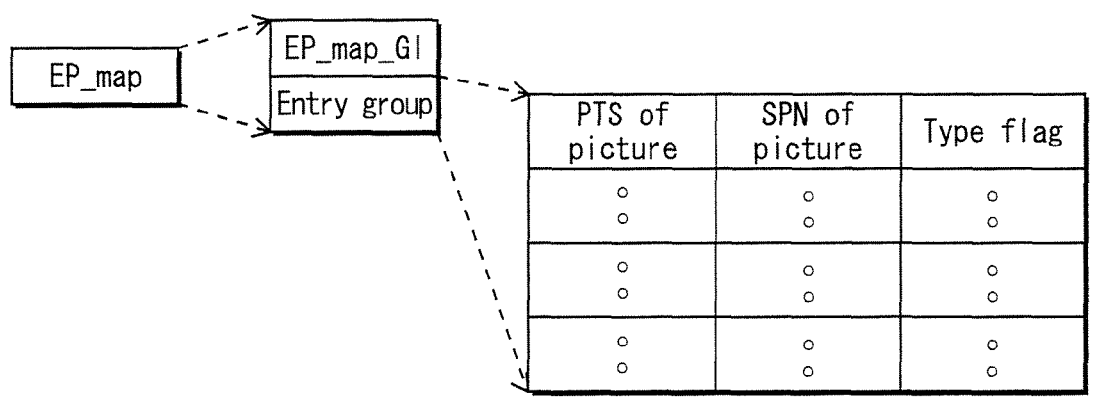
FIG. 12A shows an EP_map that is provided with a type flag.
Figure 12B:
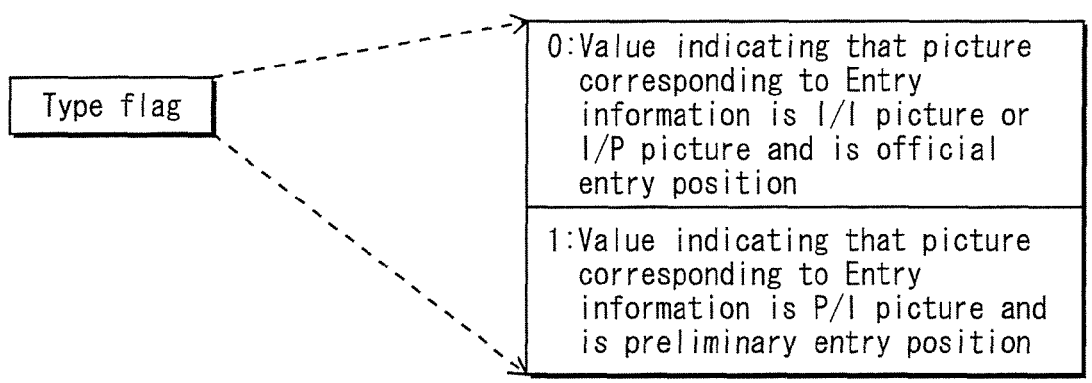
FIG. 12B shows the meaning of the type flag.

FIG. 12A shows an EP_map that is provided with a type flag. As shown in FIG. 12A, each piece of entry information in the EP_map is provided with a type flag. FIG. 12B shows the meaning of the type flag. As shown in FIG. 12B, when the type flag is set to "0", it indicates that the picture data corresponding to the Entry information is an I/I picture or an I/P picture and is an official entry position. On the other hand, when the type flag is set to "1", it indicates that the picture data corresponding to the Entry information is a P/I picture and is a preliminary entry position.

Figure 13:
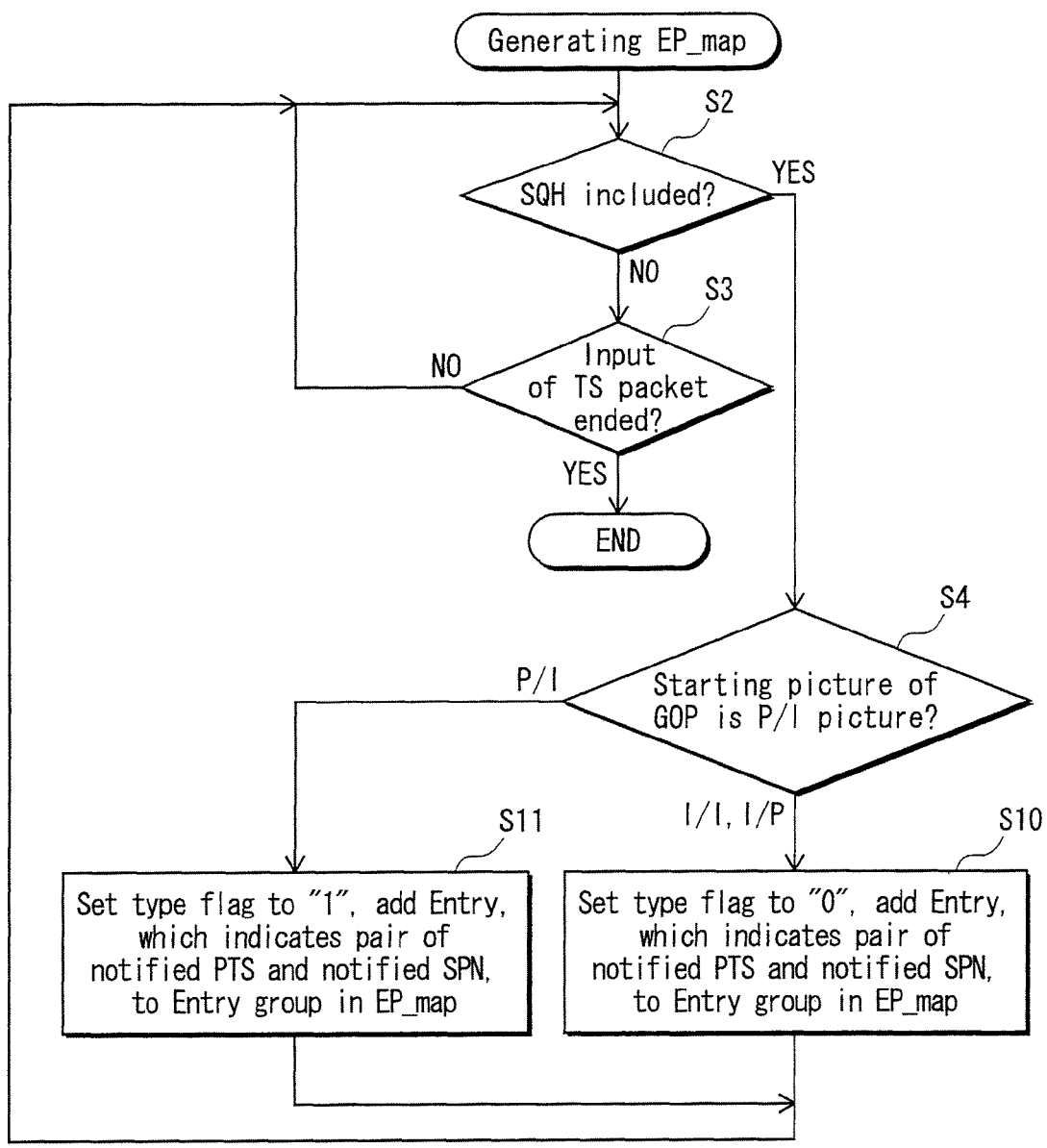
FIG. 13 is a flowchart showing the procedures of the EP_map generating unit 5 in Embodiment 2.

FIG. 13 is a flowchart showing the procedures in which the EP_map generating unit 5 generates the EP_map. When compared with FIG. 8, the flowchart of FIG. 13 does not include step S1, but includes steps S2-S4 as in FIG. 8. The flowchart of FIG. 13 processes differently depending on whether the result of the judgment in step S4 is Yes or No. When it is judged as No in step S4, the EP_map generating unit 5 sets the type flag to "0", and adds the entry information, which indicates a pair of a notified PTS and a notified SPN, to the Entry group in the EP_map (step S10). When it is judged as Yes in step S4, the EP_map generating unit 5 sets the type flag to "1", and adds the entry information, which indicates a pair of a notified PTS and a notified SPN, to the Entry group in the EP_map (step S11). This completes the description of the EP_map generation procedures in Embodiment 2.

Figure 14:
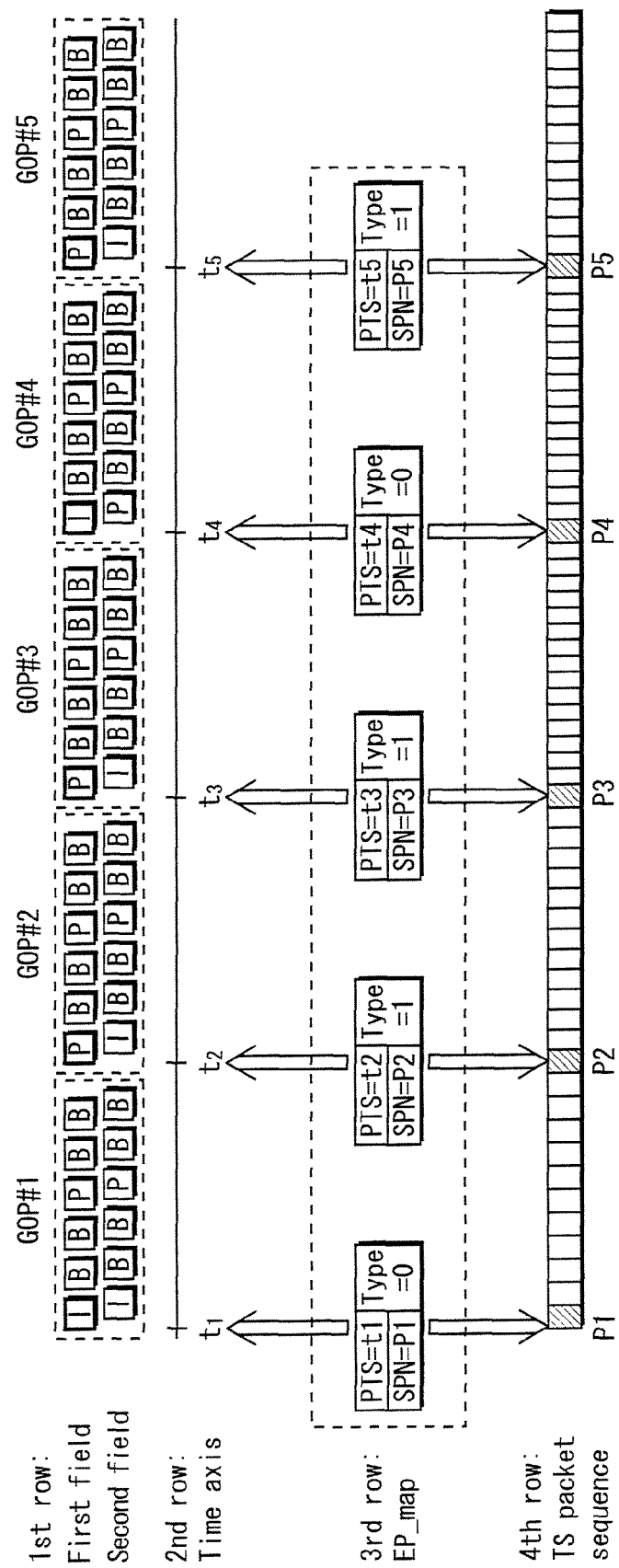
FIG. 14 shows the EP_map generated for the AVClip shown in FIG. 2.

FIG. 14 shows the EP_map generated for the AVClip shown in FIG. 2. The first row in the drawing shows the field structure of the target video stream; the second row shows the time axis of the AVClip; the third row shows the EP_map for the AVClip; and the fourth row shows a sequence of TS packets constituting the AVClip.

Each piece of entry information in the EP_map shown in the third row includes PTSs and SPNs of I/I pictures, I/P pictures, or P/I pictures. The type flag of the entry information including PTSs and SPNs of I/I pictures or I/P pictures is set to "0"; and the type flag of the entry information including PTSs and SPNs of P/I pictures is set to "1".

Since the type flag of the entry information including PTSs and SPNs of P/I pictures is set to "1", the playback apparatus 300 can recognize, by referring to the type flag, that the entry information indicates a preliminary entry position.

Up to now the recording apparatus 100 in Embodiment 1 has been described. From now on, the playback apparatus 300 in Embodiment 2 will be described. The playback apparatus 300 performs the jump-in playback or double-speed playback by referring to the EP_map in which each piece of entry information is provided with a type flag. In this playback, the playback apparatus 300 performs processes in accordance with the type flag in each piece of entry information, where the type flag indicates whether the picture data corresponding to the piece of entry information is (a) an I/I picture or an I/P picture or (b) a P/I picture. More specifically, when the entry position of a playback to be performed is a P/I picture, the playback apparatus 300 reads, into the decoder therein, a GOP that precedes, by two or three GOPs, the GOP to which the P/I picture belongs. This is done for the purpose of storing the picture data referred to by the P/I picture, into the decoder. With this structure, the picture data referred to by the P/I picture is stored in the decoder. This enables the jump-in playback or double-speed playback to be performed without reducing the resolution.

On the other hand, when the entry position of a playback to be performed is an I/P picture, the playback apparatus 300 starts the playback from the picture data indicated by the entry information, as is the case with Embodiment 1.

With the above-described structure in which depending on the setting in the type flag, the playback apparatus 300 reads, into the decoder therein, a GOP that precedes, by two or three GOPs, the GOP to which the P/I picture belongs, it is possible to perform the jump-in playback or double-speed playback without reducing the resolution.

Embodiment 3

Embodiment 3 shows an example in which the EP_map described in Embodiments 1 and 2 is structured in accordance with the BD-ROM standard. When the EP_map is structured in accordance with the BD-ROM standard, the EP_map is embedded in the Clip information. The Clip information is management information for managing AVClips, and is stored in a file with a file name that corresponds to a file name of an AVClip.

An AVClip is stored in a file with file name: "xxxxx.m2ts". Here, "xxxxx" represents a five-digit value, and "m2ts" is an extension that indicates "AVClip". The Clip information is stored in a file with a file name that is composed of the five-digit value and extension "clpi".

Figure 15:
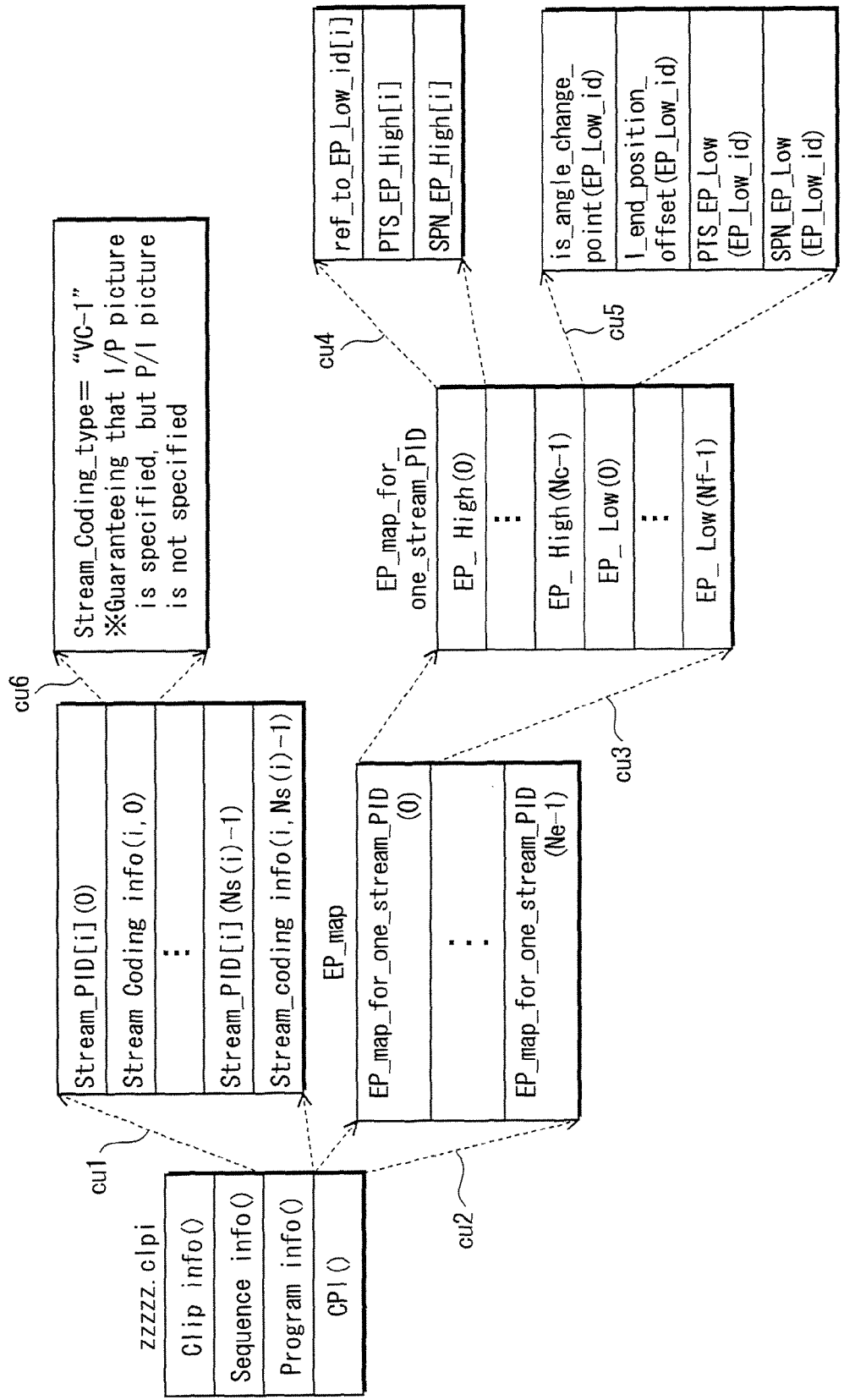
FIG. 15 shows the internal structure of the Clip information.

FIG. 15 shows the internal structure of the Clip information. As indicated on the left-hand side of the drawing, the Clip information includes:
i) "ClipInfo( )" in which the attribute information of the AVClip file;
ii) "SequenceInfo( )" in which information regarding the ATC Sequence and the STC Sequence is stored;
iii) "ProgramInfo( )" in which information regarding the Program Sequence is stored; and
iv) "CharacteristicPointInfo(CPI( ))".

The lead line cu1 in the drawing leads to a closeup of the structure of a Program Sequence (Program Sequence (i)). As the lead line indicates, Program Info for Program Sequence (i) includes Ns(i) sets of Stream_PID and Stream_Coding_Info (in FIG. 15, Stream_PID[i](0), Stream_Coding_Info (I,0), . . . Stream_PID[i](Ns(i)–1), Stream_Coding_Info (i,Ns (i)–1)).

The Stream_PID indicates a packet identifier for each elementary stream constituting an AVClip. The Stream_Coding_Info indicates an encoding method for each elementary stream constituting the AVClip.

The lead line cu6 in the drawing leads to a closeup of the structure of a Stream_Coding_Info. As the lead line indicates, Stream_Coding_Info includes Stream_Coding_Type that is information indicating the encoding method of the video stream. The Stream_Coding_Type indicates the type of the corresponding video stream that is one of VC-1, MPEG2-Video, and MPEG2-AVC. In the present embodiment, the Stream_Coding_Type has a role of the status flag described in Embodiment 1.

When the Stream_Coding_Type indicates that the corresponding video stream is MPEG2-Video or MPEG2-AVC, it means that there is no P/I picture in the video stream, and therefore can have a role of the "status flag=0" shown in Embodiment 1.

When the Stream_Coding_Type indicates that the corresponding video stream is VC-1, it means that there may be a P/I picture in the video stream, and therefore can have a role of the "status flag=1" shown in Embodiment 1.

As described above, the Stream_Coding_Type can be used as the status flag described in Embodiment 1.

<CPI(EP_Map)>

Here, the CPI will be described. The lead line cu2 in the drawing leads to a closeup of the structure of a CPI. As the lead line cu2 indicates, the CPI is composed of EP_map. The EP_map includes Ne pieces of EP_map_for_one_stream_PIDs (EP_map_for_one_stream_PID(0) to EP_map_for_one_stream_PID (Ne−1)). The EP_map_for_one_stream_PID is the EP_map for each elementary stream constituting an AVClip. The EP_map is information that indicates a packet number (SPN_EP_start) that contains Sequence_Start_Code of the starting picture of the video access unit in an elementary stream, in correspondence with the entry time (PTS_EP_start) of the starting picture of the video access unit.

The lead line cu3 in the drawing leads to a closeup of the internal structure of an EP_map_for_one_stream_PID.

As shown in the drawing, the EP_map_for_one_stream_PID includes Nc pieces of EP_High (EP_High(0) to EP_High (Nc−1)) and Nf pieces of EP_Low (EP_Low(0) to EP_Low (Nf−1)). Here, the EP_High represents higher bits of the SPN_EP_start and the PTS_EP_start, and the EP_Low represents lower bits of the SPN_EP_start and the PTS_EP_start.

The lead line cu4 in the drawing leads to a closeup of the internal structure of an EP_High(i). As the lead line indicates, the EP_High(i) includes: "ref_to_EP_Low_id[i]" that is a reference value to EP_Low; "PTS_EP_High[i]" that indicates higher bits of the PTS; and "SPN_EP_High[i]" that indicates higher bits of the SPN. It should be noted here that "i" is an identifier for identifying a given EP_High.

The lead line cu5 in the drawing leads to a closeup of the structure of an EP_Low. As the lead line indicates, the EP_Low includes: "is_angle_change_point(EP_Low_id)" that indicates whether or not the corresponding video access unit can be decoded independently; "I_end_position_offset (EP_Low_id)" that indicates the size of the Coded I frame; "PTS_EP_Low(EP_Low_id)" that indicates lower bits of the PTS of the corresponding video access unit; and "SPN_EP_Low(EP_Low_id)" that indicates lower bits of the SPN of the corresponding video access unit. It should be noted here that "Coded I frame" is the starting picture of the video access unit. The "Coded I frame" includes not only the I/I picture whose first field and second field are both the intra frame coding format, but also the I/P picture whose first field is the Intra format and second field is the Predictive format. However, the "Coded I frame" does not include the P/I picture whose first field is the Predictive format and second field is the Intra format. It should be noted here that the "EP_Low_id" is an identifier for identifying a given EP_Low.

The above-described data structure of the EP_map is based on the recitation in the above-introduced Document or the like, and will not be detailed any further in the present Description.

FIG. F16 shows the setting in the EP_map for the video stream. The first row indicates a plurality of pictures arranged in the display order. The second row indicates the time axis for the pictures. The fourth indicates a TS packet sequence on the BD-ROM. The third row indicates the setting in the EP_map.

It is presumed here that in the time axis in the second row, P/I pictures, I/I pictures, and I/P pictures are present in a period from time point t1 to time point t7. It is further presumed here that within the period from time point t1 to time point t7, a time period from t1 to t3, a time period from t3 to t5, and a time period from t5 to t7 are each approximately one second. Then, in the EP_map for a video stream representing a movie, t1, t3, and t3 among t1 to t7 are set as entry times (PTS_EP_start), and then the recording positions (SPN_EP_start) are set in correspondence with the entry times (PTS_EP_start).

Figure 16:
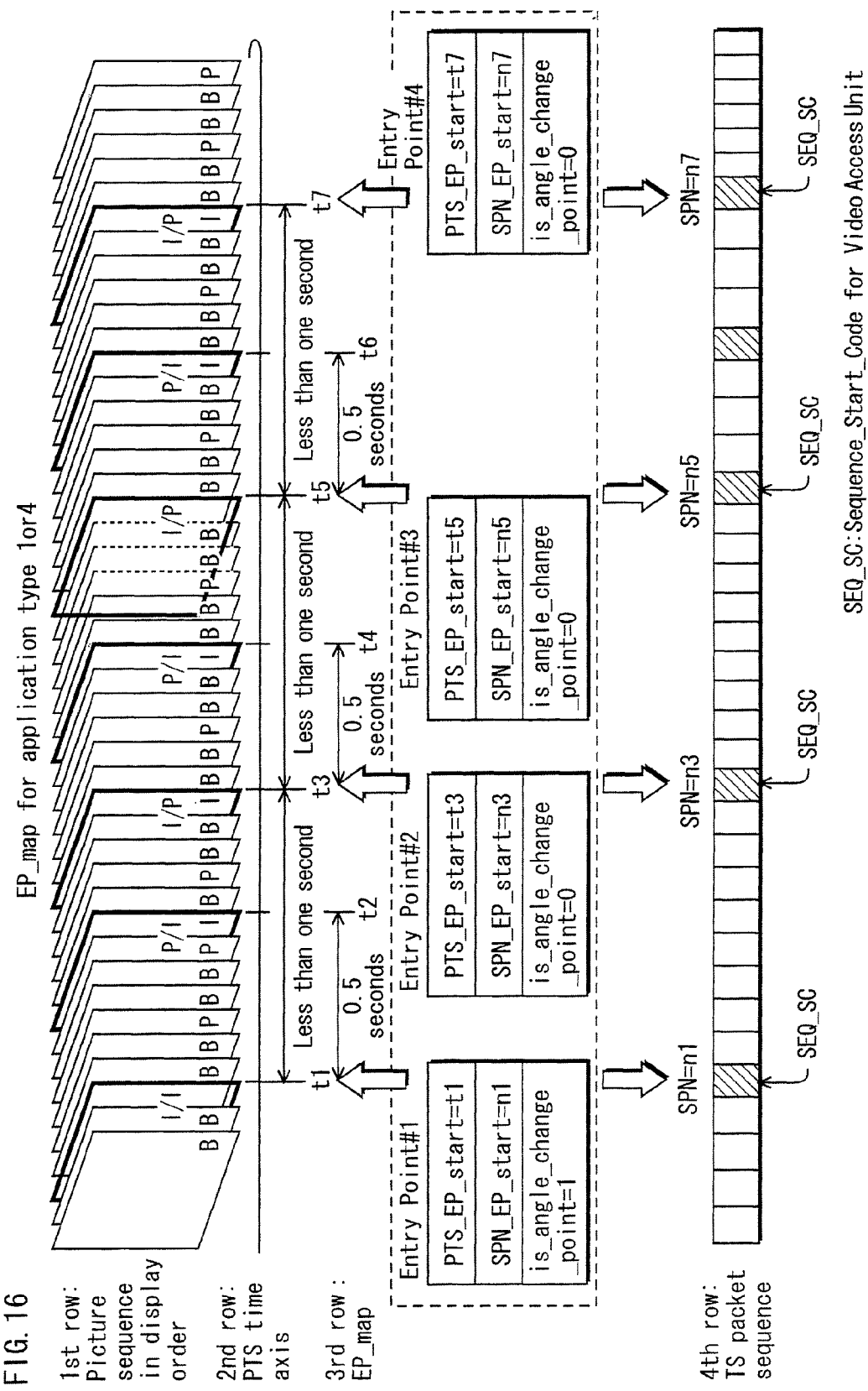
FIG. 16 shows the EP_map setting for the video stream.
Figure 17:
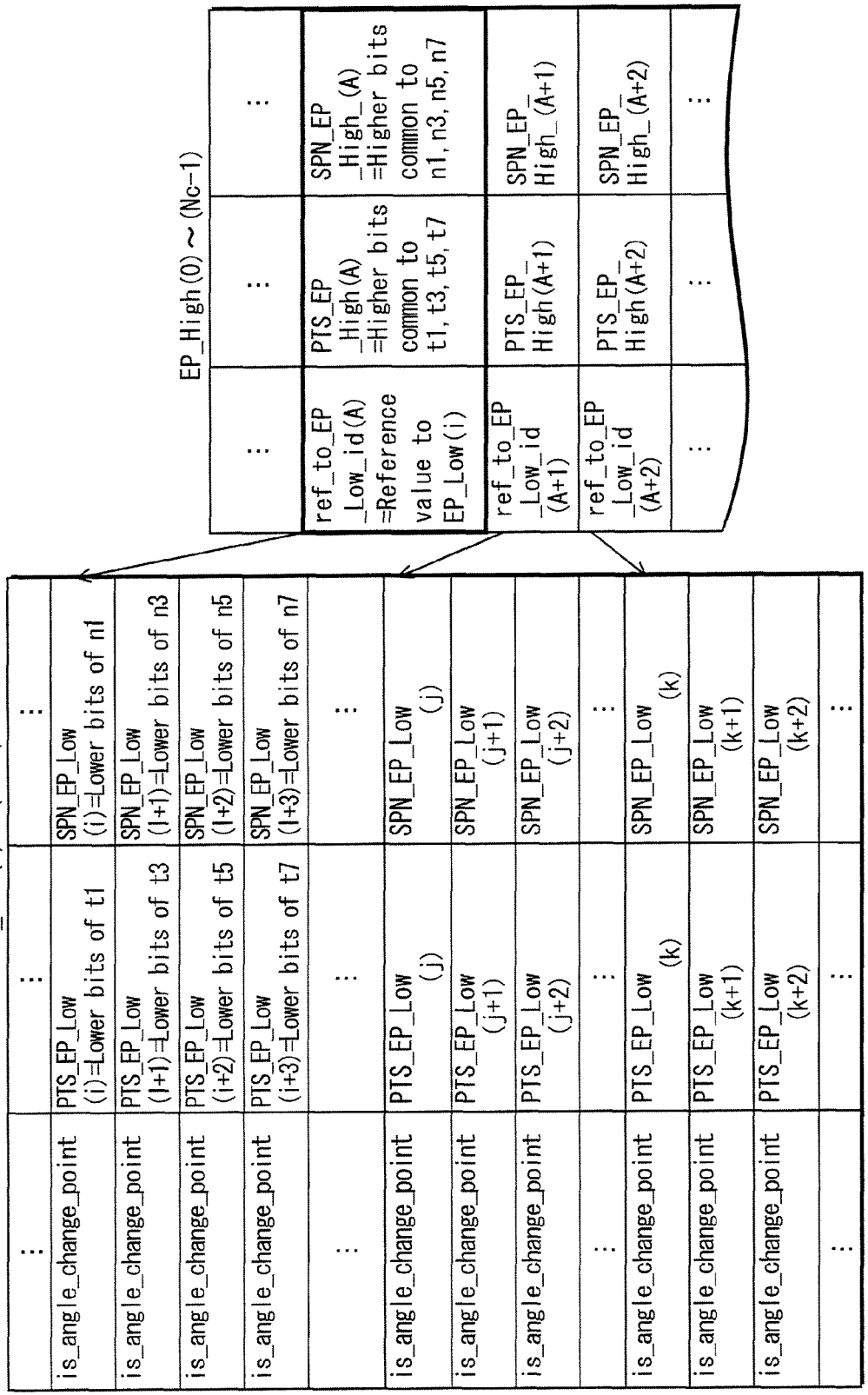
FIG. 17 shows the PTS_EP_start and the SPN_EP_start of Entry Point #1 to Entry Point #5 shown in FIG. 16, by pairs of EP_Low and EP_High.

FIG. 17 shows the PTS_EP_start and the SPN_EP_start of Entry Point #1 to Entry Point #5 shown in FIG. 16, by pairs of EP_Low and EP_High. The EP_Lows are shown on the left-hand side of the drawing, and the EP_Highs are shown on the right-hand side.

Among EP_Low(0) to EP_Low(Nf−1) shown on the left-hand side of the drawing, the PTS_EP_Lows of the EP_Low (i) to EP_Low(i+1) indicate lower bits of t1, t3, t5, and t7, and among EP_Low(0) to EP_Low(Nf−1), the SPN_EP_Highs of the EP_Low(i) to EP_Low(i+1) indicate lower bits of n1, n3, n5, and n7.

On the right-hand side of FIG. 17, EP_High(0) to EP_High (Nc−1) in the EP_map are shown. Here, when t1, t3, t5, and t7 have common higher bits and n1, n3, n5, and n7 have common higher bits, the common higher bits are written in PTS_EP_High and SPN_EP_High. The ref_to_EP_LOW_id corresponding to the EP_High is set to indicate the first EP_Low (EP_Low(i)) among EP_Lows corresponding to t1, t3, t5, t7, n1, n3, n5, and n7. With this arrangement, the higher bits that are commonly owned by the PTS_EP_Start and the SPN_EP_Start are represented by the EP_High.

<Supplementary Notes>

The above description does not show all the embodiments of the present invention. The present invention can be achieved by the following embodiments (A), (B), (C), (D), . . . . The invention defined in the claims of the present application is expansion or generalization of the above-described embodiments or modifications thereof. The level of the expansion or generalization is based on the technical level in technical field of the present invention at the time the present application is filed.

(A) The BD-ROM in Embodiment 3 can be produced by performing the following processes in sequence.

First, a plot of how to play back the BD-ROM is planned (planning process), then video and audio materials are created by recording them (material creating process), and volume structure information is created based on the plot created in the planning process (scenario creating process).

The volume structure information is information that shows, by abstract description, the format of the application layer of the optical disc.

After this, elementary streams are generated by encoding the video, audio, subtitle, and menu materials (material encoding process). The elementary streams are then multiplexed (multiplexing process).

After the multiplexing, the multiplexed streams and the volume structure information are adapted to the application layer format of the BD-ROM so that the general representation of the data to be recorded in the volume area of the BD-ROM is generated (formatting process).

Here, the application layer format of the recording medium of the present invention is an instance of a class structure written in a programming language. And the BD-JObject, Clip information, PlayList information and the like can be created by writing instances of class structures based on the sentence structure defined in the BD-ROM standard or the BD-J standard. In doing this, table-format data can be defined using the "for" sentence of the programming language. Also, such data that is necessary under certain conditions can be defined using the "if" sentence.

After the volume data is obtained by the adaptation process, it is confirmed by playing back the volume data whether or not the results of the scenario creating process are correct (emulation process). In this emulation process, it is preferable to simulate the buffer state of the BD-ROM player model.

Lastly, the press process is performed.

In this press process, the disc master is created by converting the volume image into the physical data sequence, and performing the master cutting using the physical data sequence. Further, the BD-ROM is manufactured from the master created by the press apparatus. This BD-ROM manufacturing includes processes of substrate forming, reflective layer forming, protection layer forming, bonding, and label printing.

With such processes, the recording medium (BD-ROM) for each embodiment is produced.

(B) The flowcharts shown in the above-described embodiments and the information processing of the functional components explained in the above-described embodiments satisfy the requirements for the "program invention" since the flowcharts and the information processing are realized concretely using the hardware resources and are the creation of a technical idea utilizing natural laws.

PRODUCTION OF PROGRAM OF PRESENT INVENTION

The program of the present invention can be produced as follows. First, the software developer writes, using a programming language, a source program that achieves each flowchart and functional component. In this writing, the software developer uses the class structure, variables, array variables, calls to external functions and soon, which conform to the sentence structure of the programming language he/she uses.

More specifically, the process repeatedly performed in the flowchart is written using the "for" sentence or the like defined in the sentence structure. The judgment process is written using the "if" sentence, "switch" sentence or the like defined in the sentence structure. The control on the hardware, such as the playback control on the decoder, or the access control on the drive apparatus, is written as calling the external function supplied by the manufacturer of the hardware.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

(C) The program of the present invention can be used as follows.

(i) Used as Embedded Program

When the program of the present invention is used as an embedded program, the load module as the program is written into an instruction ROM, together with the Basic Input/Output System (BIOS) program and various pieces of middleware (operation systems). The program of the present invention is used as the control program of the recording apparatus as the instruction ROM is embedded in the control unit and is executed by the CPU.

(ii) Used as Application

When the recording apparatus is a hard-disk-embedded model, the Basic Input/Output System (BIOS) program is embedded in an instruction ROM, and various pieces of middleware (operation systems) are preinstalled in the hard disk. Also, a boot ROM for activating the system from the hard disk is provided in the recording apparatus.

In this case, only the load module is supplied to the recording apparatus via a transportable recording medium and/or a network, and is installed in the hard disk as one application. This enables the recording apparatus to perform the bootstrapping by the boot ROM to activate an operation system, and then causes the CPU to execute the installed load module as one application so that the program of the present application can be used.

As described above, when the recording apparatus is a hard disk model, the program of the present invention can be used as one application. Accordingly, it is possible to transfer, lend, or supply, via a network, the program of the present invention separately.

(D) Production and Use of System LSI of Present Invention

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins play roles of an input/output interface with the drive apparatus, an input interface with the remote controller, an interface with the television, an IEEE1394 interface, an interface with the PCI bus, and the like. Since the pins of the system LSI play such roles of interfaces, the system LSI, which is connected with various circuits of the drive apparatus and the recording apparatus through such pins, plays a role of the core of the recording apparatus.

The bear chips packaged in the system LSI are the instruction ROM, CPU, decoder LSI and the like that realize the functions of each component element included in the internal structure of each embodiment as shown in the drawings.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

The details of the production procedures are as follows. First, a circuit diagram of a portion, which corresponds to the system LSI, is created based on the structure diagram shown in each embodiment.

As each constituent element is embodied, the buses connecting among circuit elements, ICs, and LSIs, and the peripheral circuits, and interfaces with external devices are defined. Further, connection lines, power lines, grand lines, clock signals and the like are defined. In these definitions, the operation timings of each constituent element are adjusted by taking the specification of the LSI into account, and other adjustments are made. For example, the band width necessary for each constituent element is guaranteed. In this way, the circuit diagram is completed.

After the circuit diagram is completed, the implementation designing is performed. The implementation designing is a work of creating a board layout in which it is determined where on the board to place the parts (circuit elements, ICs, LSIs) that are written on the circuit diagram created in the circuit designing, and it is determined how to wire the connection lines that are written on the circuit diagram.

Here, the implementation designing includes automatic placing and automatic wiring.

When a CAD apparatus is used, the automatic placing can be achieved with use of a dedicated algorithm called "centroid method". In the automatic wiring, connection lines, which connect among pins of parts in the circuit diagram, are defined using metal foils and vias. When a CAD apparatus is used, the wiring process can be achieved using dedicated algorithms called "maze method" and "line-search method".

After the implementation designing is performed and the layout on the board is made, the implementation designing results are converted into CAM data, and the CAM data is output to the facilities such as the NC machine tool. The NC machine tool performs the SoC implementation or the SiP implementation based on the CAM data. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the recording apparatus described in each embodiment above.

It should be noted here that although the term LSI is used here, it may be called IC, LSI, super LSI, ultra LSI or the like, depending on the level of integration.

Further, part or all of the components of each recording apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

(E) In all the embodiments described above, the optical disc of the present invention is the BD-ROM. However, the optical disc may be any recording medium. For example, it may be an optical disc such as DVD-ROM, DVD-RAM, DVD-RW, DVD-R, DVD+RW, DVD+R, CD-R, and CD-RW, or a magneto-optical disk such as PD or MO.

(F) In all the embodiments described above, the video stream is the AVClip defined in the BD-ROM standard. However, the video stream may be the VOB (Video Object) conforming to the DVD-Video standard or the DVD-Video Recording standard. The VOB is a program stream that is obtained by multiplexing video streams and audio streams, the program stream conforming to the ISO/IEC13818-1 standard. Also, the video stream in the AVClip may conform to the MPEG4 or WMV system. Further, the audio stream may conform to the Linear-PCM system, Dolby-AC3 system, MP3 system, MPEG-AAC system, or dts system.

The description of each embodiment is based on MPEG4-AVC (also called H.264 or JVT). However, the description may be made based on the MPEG2 video stream. Also, the present invention can easily be applied to any other image format (such as VC-1) in so far as the image in the format can be decoded separately.

INDUSTRIAL APPLICABILITY

The recording medium and recording apparatus of the present invention can be mass-produced based on their internal structures shown in the embodiments above. As such, the recording medium and recording apparatus of the present invention has the industrial applicability.

The invention claimed is:

1. A non-transitory recording medium on which a video stream and an entry map are recorded, wherein
the entry map includes a plurality of pieces of entry information,
each piece of entry information indicates an address of picture data,
the entry map does not include entry information that indicates an address of picture data whose first field is an inter frame predictive coding format and whose second field is an intra frame coding format,
the entry map includes entry information that indicates an address of picture data whose first field is the intra frame coding format and whose second field is the inter frame predictive coding format, and the entry map recorded on the non-transitory recording medium is referenced by a playback apparatus for reading and playing back the picture data from the video stream recorded on the non-transitory recoding medium.

2. The non-transitory recording medium of claim 1 on which a status flag is further recorded, wherein the status flag indicates that the entry map does not include entry information that indicates an address of picture data whose first field is the inter frame predictive coding format and whose second field is the intra frame coding format.

3. The non-transitory recording medium of claim 1 on which format information indicating an encoding method of the video stream is further recorded, wherein when the encoding method of the video stream indicated by the format information is MPEG2-Video or MPEG4-AVC, the entry map does not include entry information that indicates an address of picture data whose first field is the inter frame predictive coding format and whose second field is the intra frame coding format.

4. A recording apparatus for writing a video stream and an entry map onto a non-transitory recording medium, the recording apparatus comprising:

a detecting unit operable to detect an address of picture data in the video stream;

a generating unit operable to generate entry information in accordance with a result of the detection by the detecting unit; and a writing unit operable to write an entry map including the generated entry information onto the recording medium in correspondence with the video stream, wherein if the detecting unit detects an address of picture data whose first field is an intra frame coding format and whose second field is an inter frame predictive coding format, the generating unit generates in the entry map, a piece of entry information indicating the address of picture data, and the generating unit does not generate, in the entry map, a piece of entry information indicating the address of picture data whose first field is the inter frame predictive coding format and whose second field is the intra frame coding format.

5. The recording apparatus of claim 4, wherein the writing unit writes a status flag onto the recording medium, and the status flag indicates that the entry map does not include entry information that indicates an address of picture data whose first field is the inter frame predictive coding format and whose second field is the intra frame coding format.

6. The recording apparatus of claim 5, wherein if the video stream does not include a picture whose first field is the inter frame predictive coding format and whose second field is the intra frame coding format, the writing unit causes the status flag to indicate that the video stream does not include the picture.

7. A program stored on a non-transitory recording medium for causing a computer to perform a process of writing a video stream and an entry map onto a non-transitory recording medium, the program causing the computer to perform:

detecting an address of picture data in the video stream;
generating entry information in accordance with a result of said detecting; and writing an entry map including the generated entry information onto the recording medium in correspondence with the video stream, wherein if said detecting detects an address of picture data whose first field is an intra frame coding format and whose second field is an inter frame predictive coding format, said generating generates, in the entry map, a piece of entry information indicating the address of picture data, and said generating does not generate, in the entry map, a piece of entry information indicating the address of picture data whose first field is the inter frame predictive coding format and whose second field is the intra frame coding format.

8. A recording method for writing a video stream and an entry map onto a non-transitory recording medium, the recording method comprising:

detecting an address of picture data in the video stream;
generating entry information in accordance with a result of said detecting; and writing an entry map including the generated entry information onto the recording medium in correspondence with the video stream, wherein if said detecting detects an address of picture data whose first field is an intra frame coding format and whose second field is an inter frame predictive coding format, said generating generates, in the entry map, a piece of entry information indicating the address of picture data, and said generating does not generate, in the entry map, a piece of entry information indicating the address of picture data whose first field is the inter frame predictive coding format and whose second field is the intra frame coding format.

9. A non-transitory recording medium on which a video stream and an entry map are recorded, wherein the video stream includes a plurality of pieces of picture data, the entry map includes a plurality of pieces of entry information the entry map includes entry information that indicates an address of picture data whose first field is an intra frame coding format and whose second field is an inter frame predictive coding format, the entry map does not include entry information that indicates an address of picture data whose first field is the inter frame predictive coding format and whose second field is the intra frame coding format, and the entry map recorded on the non-transitory recording medium is referenced by a playback apparatus for reading and playing back the picture data from the video stream recorded on the non-transitory recoding medium.

10. A playback apparatus for playing back a video stream recorded on a non-transitory recording medium, in accordance with an entry map recorded on the recording medium, wherein the entry map includes a plurality of pieces of entry information, each piece of entry information indicates an address of picture data, the entry map includes entry information that indicates an address of picture data whose first field is an intra frame coding format and whose second field is an inter frame predictive coding format, the entry map does not include entry information that indicates an address of picture data whose first field is the inter frame predictive coding format and whose second field is the intra frame coding format, and the playback apparatus reads picture data from the video stream recorded on the recording medium by referencing the entry map recorded on the recording medium, and plays back the picture data.

11. A playback method for playing back a video stream recorded on a non-transitory recording medium, in accordance with an entry map recorded on the recording medium, wherein the entry map includes a plurality of pieces of entry information, each piece of entry information indicates an address of picture data, the entry map includes entry information that indicates an address of picture data whose first field is an intra frame coding format and whose second field is an inter frame predictive coding format, the entry map does not include entry information that indicates an address of picture data whose first field is the inter frame predictive coding format and whose second field is the intra frame coding format, and the playback method reads picture data from the video stream recorded on the recording medium by referencing the entry map recorded on the recording medium, and plays back the picture data.

12. The non-transitory recording medium of claim 1, wherein the video stream is a VC-1 video stream.

13. The recording apparatus of claim 4, wherein the video stream is a VC-1 video stream.

14. The program stored on the non-transitory recording medium of claim 7, wherein the video stream is a VC-1 video stream.

15. The recording method of claim 8, wherein the video stream is a VC-1 video stream.

16. The non-transitory recording medium of claim 9, wherein the video stream is a VC-1 video stream.

17. The playback apparatus of claim 10, wherein the video stream is a VC-1 video stream.

18. The playback method of claim 11, wherein the video stream is a VC-1 video stream.

\* \* \* \* \*